United States Patent
Dahiya et al.

(10) Patent No.: US 10,860,885 B2
(45) Date of Patent: Dec. 8, 2020

(54) METHOD AND SYSTEM FOR MANAGEMENT AND OPERATION OVER IMAGE IN A COMPUTING SYSTEM

(71) Applicant: SAMSUNG ELECTRONICS CO., LTD., Suwon-si (KR)

(72) Inventors: Rajan Dahiya, Noida (IN); Abhishek Jain, Dewas (IN); Dhananjay L Govekar, Mumbai (IN); Ayush Chaturvedi, Mathura (IN); Ankit Agarwal, Ghaziabad (IN); Jaideep Kumar Vishwakarma, Noida (IN); Nitesh Goyal, Ghaziabad (IN); Sunil Rathour, Noida (IN); Aman Jindal, Rampur (IN); Deepak Kumar Garg, Distt-Sirsa (IN); Mohit Chhabra, Patiala (IN); Vobbilisetty Sushant, Cuttack (IN); Nirmal Pandey, Noida (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 133 days.

(21) Appl. No.: 16/193,571

(22) Filed: Nov. 16, 2018

(65) Prior Publication Data

US 2019/0147293 A1 May 16, 2019

(30) Foreign Application Priority Data

Nov. 16, 2017 (IN) .............................. 201711012422

(51) Int. Cl.
*G06K 9/62* (2006.01)
*G06K 9/00* (2006.01)
*G06K 9/46* (2006.01)

(52) U.S. Cl.
CPC ....... *G06K 9/6215* (2013.01); *G06K 9/00228* (2013.01); *G06K 9/00288* (2013.01);
(Continued)

(58) Field of Classification Search
CPC ............. G06K 9/6215; G06K 9/00295; G06K 9/6202; G06K 9/00288; G06K 9/4652; G06K 9/00228; G06K 9/4642
(Continued)

(56) References Cited

U.S. PATENT DOCUMENTS

| 6,502,105 B1 | 12/2002 | Yan et al. |
| 8,015,162 B2 | 9/2011 | Henzinger |

(Continued)

FOREIGN PATENT DOCUMENTS

| CN | 109345538 | * 2/2019 | ............... G06T 7/10 |
| JP | 2011-243156 A | 12/2011 | |

(Continued)

OTHER PUBLICATIONS

International Search Report (PCT/ISA/210) dated Feb. 14, 2019 issued by the International Searching Authority in International Application No. PCT/KR2018/014069.
(Continued)

*Primary Examiner* — Jerome Grant, II
(74) *Attorney, Agent, or Firm* — Sughrue Mion, PLLC

(57) ABSTRACT

A method of processing an image in an electronic device. The method may comprise; obtaining a first image; selecting, based on comparing the first image with a plurality of second images, at least one third image from the plurality of second images, wherein the at least one third image is similar to the first image; identifying an identifier of an image group corresponding to the at least one third image; associating the first image with the identifier of the image
(Continued)

group; and notifying, on the device, based on the identifier of the image group, existence of the at least one third image.

16 Claims, 22 Drawing Sheets

(52) U.S. Cl.
 CPC ....... *G06K 9/00295* (2013.01); *G06K 9/4642* (2013.01); *G06K 9/4652* (2013.01); *G06K 9/6202* (2013.01)

(58) Field of Classification Search
 USPC .......................................... 382/118
 See application file for complete search history.

(56) References Cited

U.S. PATENT DOCUMENTS

| | | |
|---|---|---|
| 2007/0195344 A1 | 8/2007 | Mochizuki et al. |
| 2007/0239756 A1 | 10/2007 | Li et al. |
| 2008/0298766 A1 | 12/2008 | Wen et al. |
| 2010/0172551 A1 | 7/2010 | Gilley et al. |
| 2010/0309335 A1 | 12/2010 | Brunner et al. |
| 2012/0002094 A1 | 1/2012 | Jelicz |
| 2013/0156275 A1 | 6/2013 | Amacker et al. |
| 2015/0020007 A1 | 1/2015 | Lederer |
| 2018/0293711 A1* | 10/2018 | Vogels .................... G06F 17/10 |
| 2019/0095791 A1* | 3/2019 | Liu ........................ G06K 9/6273 |
| 2020/0103236 A1* | 4/2020 | Adams ............... G01C 21/3626 |

FOREIGN PATENT DOCUMENTS

| | | |
|---|---|---|
| KR | 10-2010-0131295 A | 12/2010 |
| KR | 10-1508068 B1 | 4/2015 |

OTHER PUBLICATIONS

Written Opinion (PCT/ISA/237) dated Feb. 14, 2019 issued by the International Searching Authority in International Application No. PCT/KR2018/014069.

* cited by examiner

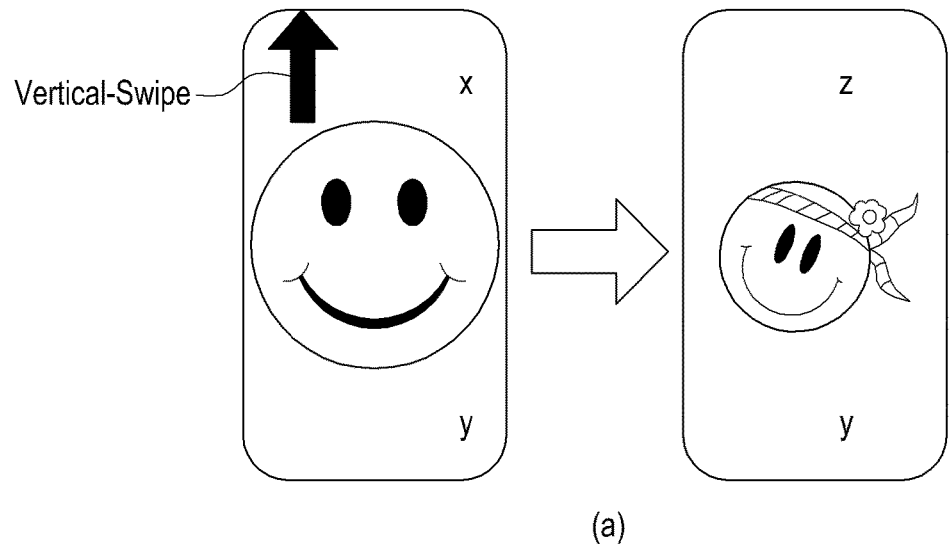
(a)
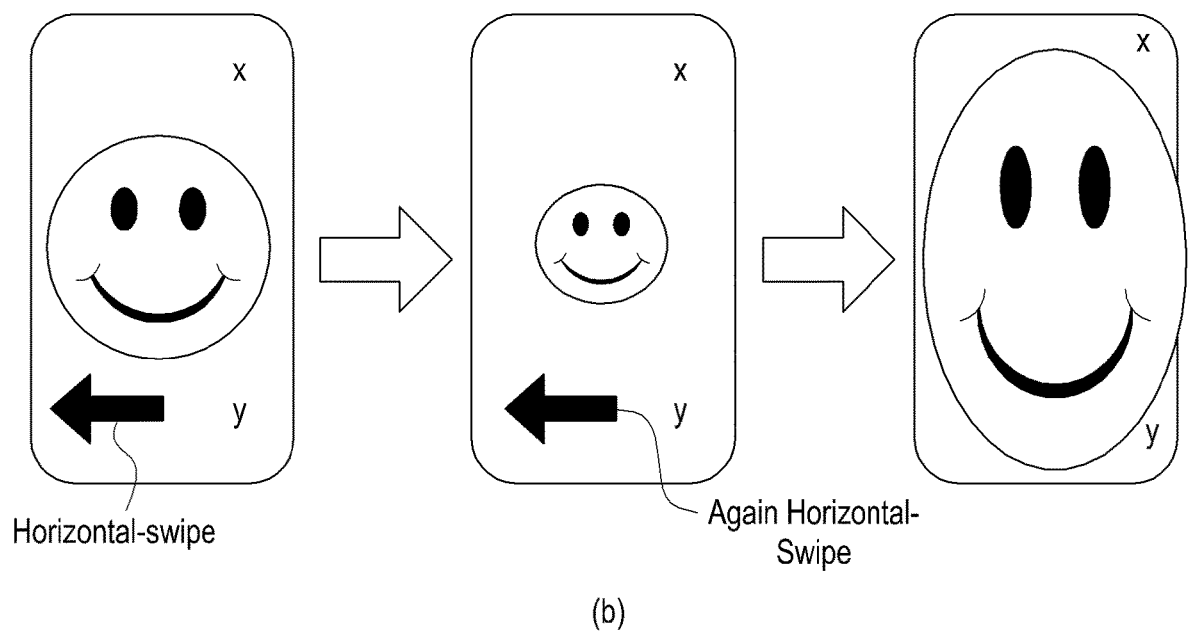
(b)
FIG.9

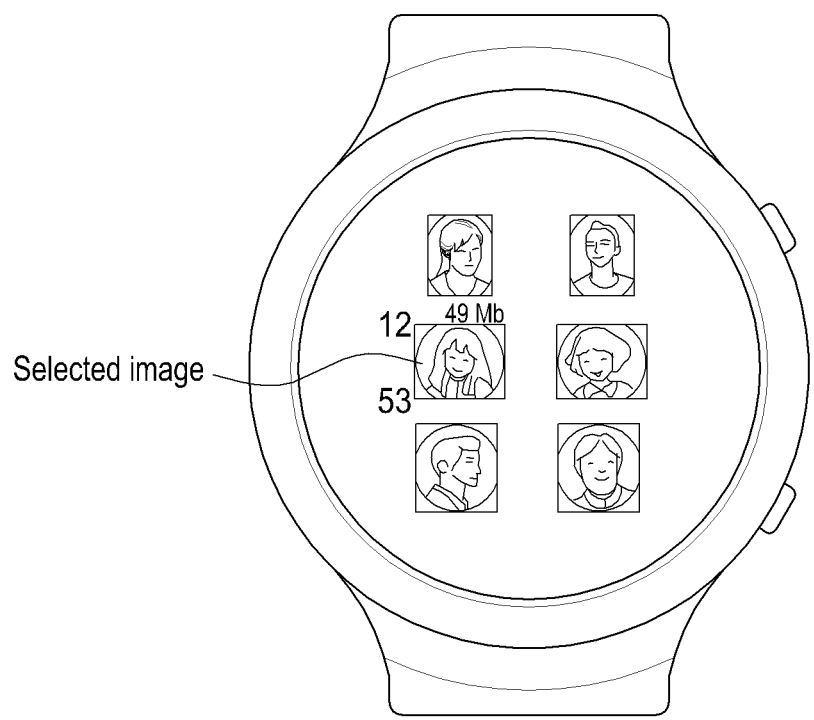
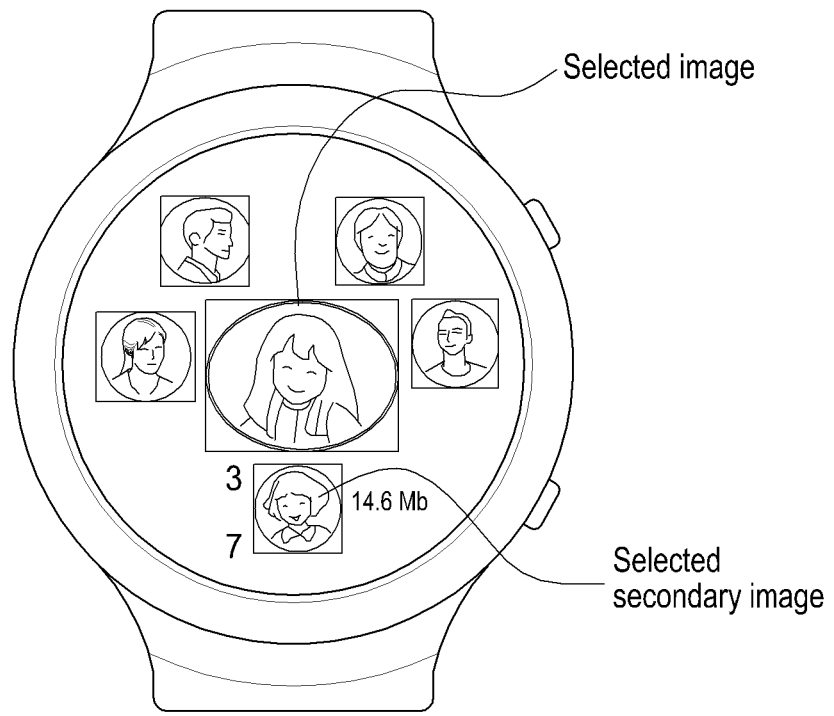
FIG.10

In the keyboard, device displays all the various Facial expressions (from the similar images) of user. User can share his expressons using these similar images. ←

METHOD AND SYSTEM FOR MANAGEMENT AND OPERATION OVER IMAGE IN A COMPUTING SYSTEM

CROSS-REFERENCE TO RELATED APPLICATION(S)

This application is based on and claims priority under 35 U.S.C. 119 to Indian Patent Application No. 201711012422, filed on Nov. 16, 2017, in the Indian Patent Office, the disclosure of which is incorporated by reference herein in its entirety.

1. FIELD

The disclosure relates to computing devices and in particular to managing images and memory within the computing devices.

2. DESCRIPTION OF RELATED ART

Storage of images in a mobile device has become commonplace. While navigating through groupings of similar images in a gallery, there can be multiple similar or duplicate images in the device. For example, when photographing, many users sequentially acquire multiple images of a same scene in effort to obtain one best image. Naturally, these sequentially acquired and similar images are also stored in sequence in memory. Frequently, after photography, a user may review the multiple images and select the best image, and then discard or delete the unselected images. Currently if a user is viewing an image on full screen, the user may swipe to view next image. So if there are multiple similar images, the user is forced to swipe among the redundant images.

Taking into account a wearable device such as a smartwatch having a 'bezel' acting as the rotary knob as a navigational-control, a user may be viewing a current image and the next 'three' images similar to the current image. Because the user does not know about the images following the current image being redundant to the current image, the user must continue rotating bezel or swipe right multiple times to reach a next image that is unique or not similar to the current image. Thus, thereby requiring successive user input to navigate among the images. In case the quantity of similar or identical images is large, a user may become irritated when searching the images for unique images.

With the extensive use of social media sites and applications for image-sharing by users on their devices, the existence of multiple similar copies of a same image is a very common scenario and causes unnecessary memory occupancy. Such multiple and redundant copies of similar images incurs inefficient memory usage. Such problem surfaces in a new form in case of networked devices (e.g. family member devices), owing to presence of 'redundant-images' dispersed across multiple devices of group members or family; or devices that share common data, such as that stored remotely in a cloud server, but maintain local duplicate copies of the data.

Still further, in some instances, the user may not be aware that similar images are stored in the device. Accordingly, the user may redundantly photograph or download similar images, thereby resulting a huge number of stored redundant images. In an example, the redundancy of images occurs due to various reasons.

Still further, in case a user wants to reply with images related to same theme, the user should check a gallery and review all the images till the desired image is found. Accordingly, the user is generally reluctant to browse through the gallery to find theme-based images and generally prefers other search mechanisms, such as the Internet.

Accordingly, there exists a need to facilitate navigation of the images through a computing device at least by grouping similar and/or identical images.

Further, there exists another need to optimize memory space within the mobile device by automatically deleting the redundant image files or motivating a user to that effect by automatically sending recommendations.

SUMMARY

This summary is provided to introduce a selection of concepts that are further described in the detailed description. This summary is not intended to identify key or essential concepts, nor for determining the scope of the disclosure.

According to an embodiment, there is provided a method including receiving a selected image, identifying the selected image through an identifier of an image group, rendering on the device based on the identifier of the image group at least one of: a notification of existence of one or more similar images that are similar to the selected image and an operation within the electronic device to enable a user to navigate from viewing the selected image to another image bypassing the one or more similar images.

According to an embodiment, there is provided a method of identifying an image in an electronic device. The method may comprise; obtaining a first image; identifying the first image through an identifier of an image group based on a plurality of second images, wherein the image group corresponds to at least one third image selected among from the plurality of second images and the at least one third image is similar to the first image; and rendering, on the electronic device based on the identifier of the image group, at least one of: a notification of existence of the at least one third image; and an operation within the electronic device to enable a user to navigate from the first image to another image bypassing the at least one third image.

According to an embodiment, there is provided a method of processing an image in an electronic device. The method may comprise; obtaining a first image; selecting, based on comparing the first image with a plurality of second images, at least one third image from the plurality of second images, wherein the at least one third image is similar to the first image; identifying an identifier of an image group corresponding to the at least one third image; associating the first image to the identifier of the image group; and notifying, on the device, based on the identifier of the image group, existence of the at least one third image.

Thus, the disclosure contemplates saving memory by removing redundant images based on the remaining memory present in device, removing identical images from all networked-devices and storing respective copies of deleted files in the same external storage, skipping similar images in the device, providing colored indications to refer to the identities of the forthcoming images, displaying a count of the quantity of similar images with respect to the current image, providing similar images suggestions with respect to a video frame, replacing all duplicate images with an original image in a media service provider so that websites (i.e. social networking sites) point to identical images and duplicates are deleted without any side effect, removing the similar images based on some characteristic thereof, etc.

To further clarify, a more particular description will be rendered by reference to embodiments thereof, which are illustrated in the appended drawings.

BRIEF DESCRIPTION OF THE DRAWINGS

These and other features, aspects, and advantages of the certain embodiments will become better understood when the following detailed description is read with reference to the accompanying drawings in which like characters represent like parts throughout the drawings, wherein:

FIG. 9 illustrates an implementation, in accordance with an embodiment;

FIG. 10 illustrates an exemplary implementation, in accordance with an embodiment;

Figure 1:
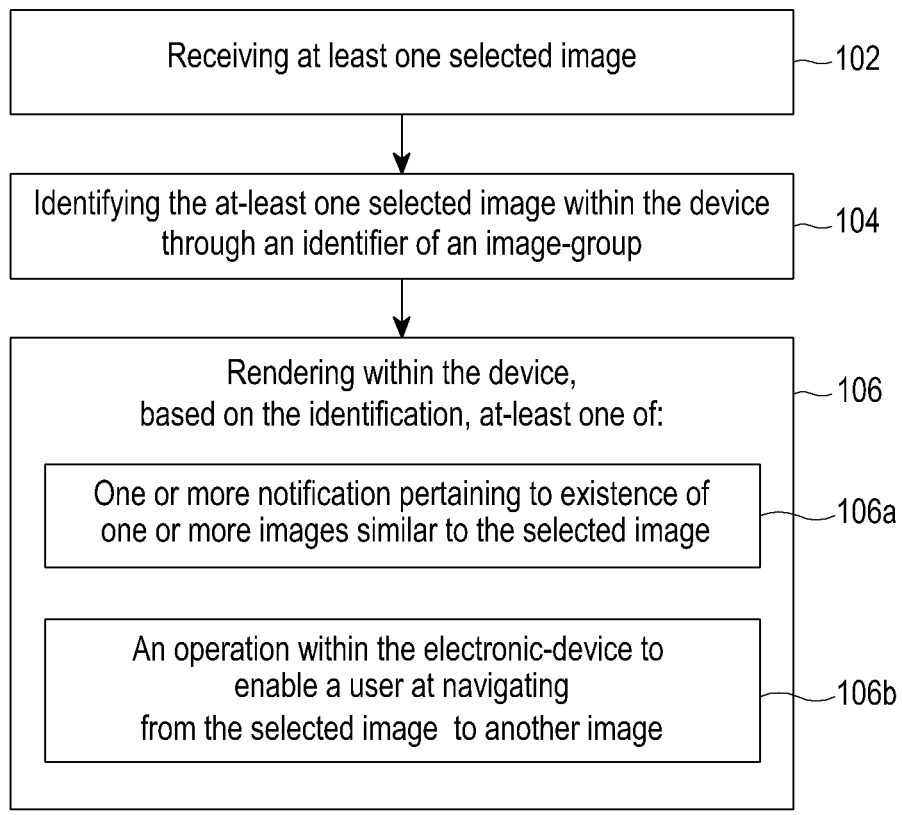
FIG. 1 illustrates a flow chart of a method, in accordance with an embodiment.

Further, skilled artisans will appreciate that elements in the drawings are illustrated for simplicity and may not have been necessarily been drawn to scale. For example, the flow charts illustrate steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure to avoid obscuring the drawings with details that will be readily apparent to those of ordinary skill in the art having benefit of the description herein.

DETAILED DESCRIPTION OF EMBODIMENTS

For the purpose of promoting an understanding of the disclosure, reference will now be made to the embodiments illustrated in the drawings. It will be understood that further modifications may be contemplated in the illustrated system, and such further applications of the principles of the disclosure as illustrated therein being contemplated as would normally occur to one skilled in the art to which the disclosure relates.

It will be understood by those skilled in the art that the foregoing description and the following detailed description are explanatory are not intended to be restrictive thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the disclosure will be described below in detail with reference to the accompanying drawings.

FIG. 1 illustrates a flow chart of a method of performing an image-related operation in a device.

The method comprises receiving (step 102) at least one selected image from a user. The selection is done through the computing device either based on a manual selection done by the user through the device or an automatic selection performed by the device in respect of a video frame an image or video stored within the device.

The selected image within the electronic device may be at least one of a pre-stored image, a pre-captured image, an image in a camera view rendered within the device, an image within the frame of a recorded video, and an image within the frame of a video being recorded. The selected image is identified (step 104) within the device through an identifier of an image group. As may be understood, the image group corresponds to a group of similar images, wherein such similarity is determined in accordance with a predetermined threshold as described in the forthcoming paragraph.

The identification of the image initiates with dividing the selected image into a plurality of segments. An average and a dominant color-value for each of the segments is determined as a set of parameters. The set of parameters of the selected image is compared with a corresponding set of predetermined parameters of at least one other image to obtain a quantum or extent of similarity. In case the quantum is above a predefined threshold, a group-identifier of the at least one other image is associated with the image under consideration for categorizing the selected image. However, in case the quantum is below a predefined threshold, a fresh image group identifier is generated for associating with the selected image.

In another scenario, the plurality of segments may be further classified into high and low priority sets. The high priority sets correspond to middle fragments within the image and refer a high probability of comprising relevant portions of the image. Accordingly, comparison of parameters for high priority fragments of the image may be scheduled prior to low priority segments.

Further, the similar images as identified with respect to a current image under consideration may be classified based on a human being based visual perception as an image interpretable as a clear image, or an image interpretable as a blurred image. In another scenario, the similar image may be marked as having a first portion interpretable as a clear image, wherein the first portion represents the image similar to the at least one selected image. However, a second portion of such similar image may be marked as blurred. The visual perception may be an electronically simulated criteria within the electronic device to facilitate the classification. Accordingly, when similar images are shown, blurred images may or may not be manifested.

Accordingly, based on the identification of the image, one or more notifications are rendered (step 106) within the device. The notifications pertain to existence of one or more images similar to the selected image, wherein such similar images may be within the device itself or dispersed across one or more devices as connected to the current device. Accordingly, a count of one or more images similar to the selected image may be additionally displayed The notification of the count further comprises displaying a count of non-similar images within the periphery of the selected image, wherein the non-similar image comprises a face representation similar to the selected image and differs from the selected image based on a manifestation of the similar face representation. For example, in one image a person is in traditional wear, while the same person in other image is wearing casual attire.

In addition, the notification further comprises depicting a memory consumption due to presence of one or more similar images with respect to the selected image. Again, such similar image consuming memory may be present within the device itself or may be present within a shared external storage linked to the device. The shared storage as depicted herein is a centralized storage for maintaining data with respect to the user and acquaintances, and implementable as a real or virtual storage.

Furthermore, instead of notification, a plurality of similar images around the selected image may be directly depicted for motivating a user to operate upon one or more the similar images. For example, a plurality of images representing different facial-expressions of a living being as identified within the selected image may be depicted. Accordingly, the user may delete or retain the similar or partially similar images based on his discretion.

Furthermore, apart from or in place of the notification, an operation may be rendered (step 104) to enable a user at navigating from the selected image to another image through bypassing one or more images similar or identical to the selected image. In other words, during the navigation, one or more similar or identical images may be skipped and the user may be led to a different image than the current image under consideration. Such an operation as rendered for a user involves receiving a user gesture in a predetermined direction within the device. For example, the user may simply swipe vertically or horizontally in a specified direction to navigate across similar images. Upon having received such user input, the display of the computing device is changed from the currently selected image to either a similar image or a non-similar image, based on the predetermined direction.

In case the current electronic device under consideration is an auxiliary device (e.g. a smart watch) which are linked to a central electronic device (e.g. a mobile device or a tablet) and have usually small user interfaces. Accordingly, in such a scenario, the images may not be depicted in a full-fledged form but as face images, i.e. face of a prominent person or living being identified in the image. Upon receiving a selection of any one the at least one face image, counts may be displayed of identical images and non-identical images but having similar face. Upon re-selection of the face image, a new display be rendered wherein the selected face image is now surrounded by face images of different persons who have been photographed with the person related to the selected face image. In such a scenario, upon a further selection of the face image of such 'connected-person', a fresh count is depicted which illustrates a total number of photographs comprising the initial-most selected face image and face image of the 'connected-person' as has been selected.

Further, in respect of auxiliary devices having the restricted user interfaces unlike the regular mobile devices, a user may be notified through one or more indicators (i.e. color-indicators) about one or more other images positioned prior and next in the sequence with respect to the selected image. Different color indicators may be used to define different types of images as one or more of:
  a) a similar image;
  b) a marginally different image than the selected image;
  c) a completely different image than the selected image.

Based on the direction and a magnitude of the received user gesture, the display is changed from the currently selected image to the at least one other image positioned either prior or next-in-sequence to the selected image.

Further, a memory state of the electronic device may be divided into a plurality of levels with respect to a low memory state within the device. For example, a memory level beyond 30% may be label as low, beyond 20% as extremely low and beyond 10% as severe. Accordingly, an automatic removal of a predetermined class of images may take place upon attainment of a particular level as defined. While a first type or class of similar images comprises duplicate image, a second type or class of similar images comprises non-duplicate yet relevant-image (i.e. a different or irredundant image of the same person), blurred images (as have been already classified), and non-frequently used images.

The automatic removal class of images may include deletion of images from the main memory of the electronic device, archival of the images within the electronic device, and transfer of the images from the electronic device to an external-memory.

Further, the similar images as found earlier may be used to modify the analogous images. For example, an image under consideration (whose similar image has been found) may be further improved based on the similar image as has been found. Such improvisation may especially come handy because in case a portion of one image is not clear or blurred and morphed, the blurred portion may be corrected based on the similar image. Likewise, a backdrop of the image may be changed based on a different backdrop found in the similar-image.

Further, in case the selected image corresponds to the video frame, the associated video may be modified based on the similar image. For example, a person appearing in western wear in a video may be replaced by the image of the same person in traditional wear, thereby leading to video-morphing takes place. Moreover, different moods/found in the similar images may be used to formulate a list of emoticons with respect to the same person. Further, a multimedia work (such as a slideshow or a flash-work) comprising the selected image and/or the similar image may be created.

Furthermore, based on the similar images as found, a wallpaper is rendered that automatically changes from an initial state to one or more further states, wherein the initial state corresponds to the selected image and further state correspond to the one or more similar images.

Figure 2:
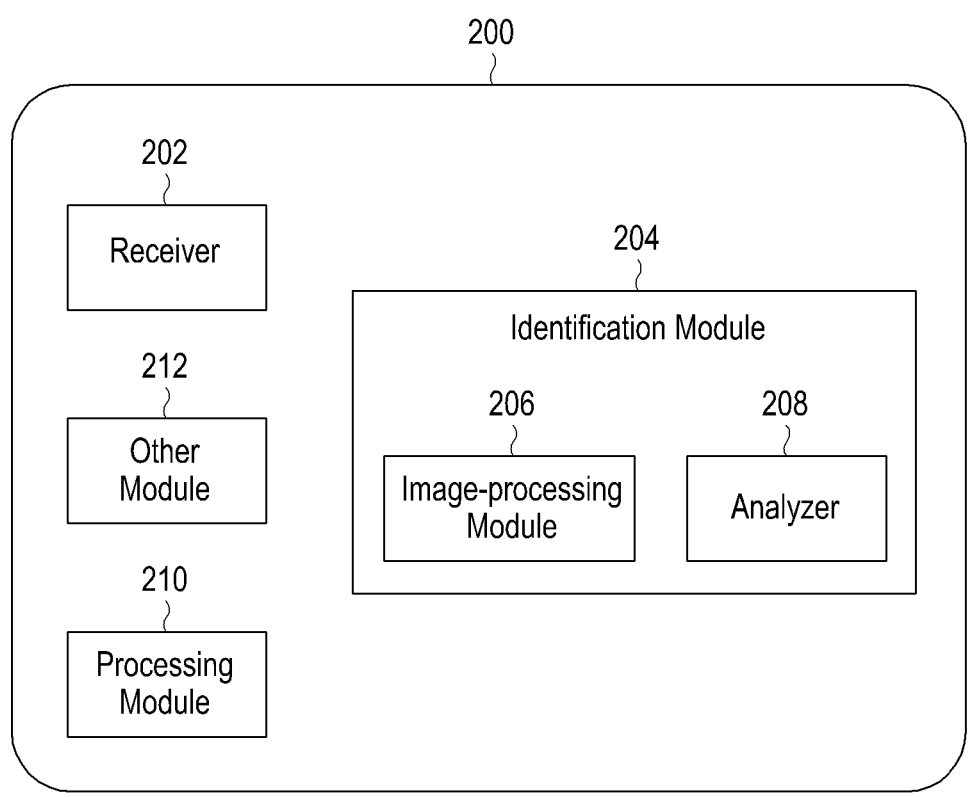
FIG. 2 illustrates a block diagram of a device in accordance with an embodiment.

FIG. 2 illustrates a block diagram of a device, in accordance with an embodiment.

The device 200 includes a receiver 202 that performs step 102, an identification module 204 that performs step 104 and a processing module 210 that performs step 106. The identification module 204 may in turn be a combination of an image processing module 206 and an analyzer 208 for the performance of step 104 and ancillary functions. Likewise, there may be other modules 210 within the system 200 that facilitate the operational interconnection among the modules 202 till 206, and perform other ancillary functions. The processing module 210 may comprise at least one processor. The device 200 may include a transmitter. The device 200 may include a transceiver. The transceiver may include the receiver 200 and the transmitter.

Figure 3:
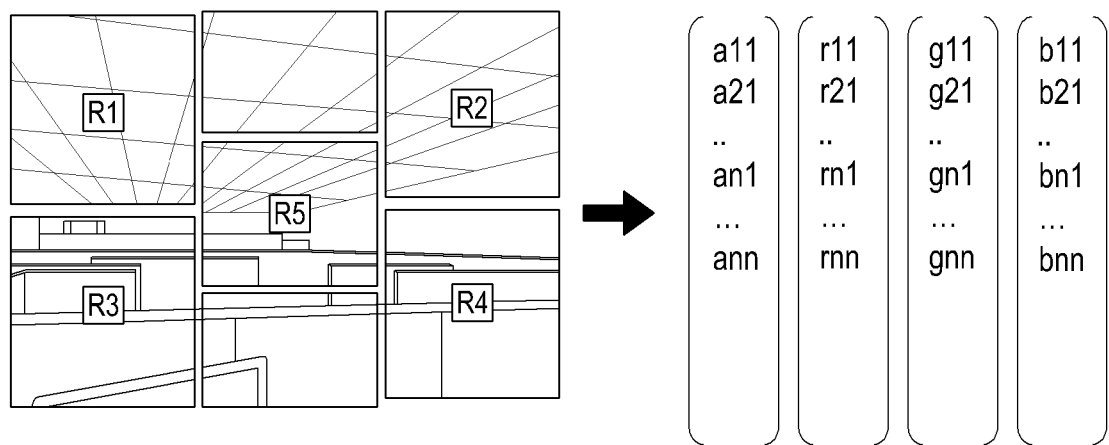
FIG. 3 illustrates a diagram of analyzing an image, in accordance with an embodiment.

FIG. 3 illustrates a diagram of analyzing an image, in accordance with an embodiment.

More essentially, the present figure represents an exemplary part-implementation of step 104 and a functionality of the image processing module (206).

The present implementation facilitates classification of images right from the moment they are captured or saved in the file system, thereby enabling a computing system to handle one image at a time, and removing any processing delays that may arise out of bulk classifications. Any new images saved on a file system are monitored and the new saved images are processed in the background.

Upon capturing of an image by a camera and its storage, the present procedure is triggered. The procedure relies on extracting certain color based information from the image that helps a subsequent quick identification of the image and grouping of similar images. As shown in present figure, a particular image is represented by N (e.g., N=5) values of average color information corresponding to N different regions of the image. Each image is further represented by N (e.g., N=5) maximum color components (R/G/B) corresponding to the maximum color belonging to the N regions of the image. In an example, the matrix depicted in the FIG. 3 corresponds to a Region 1's (i.e. R1) matrix representation of the pixel components as $A_{R1}$, $R_{R1}$, $G_{R1}$, $B_{R1}$.

Figure 4:
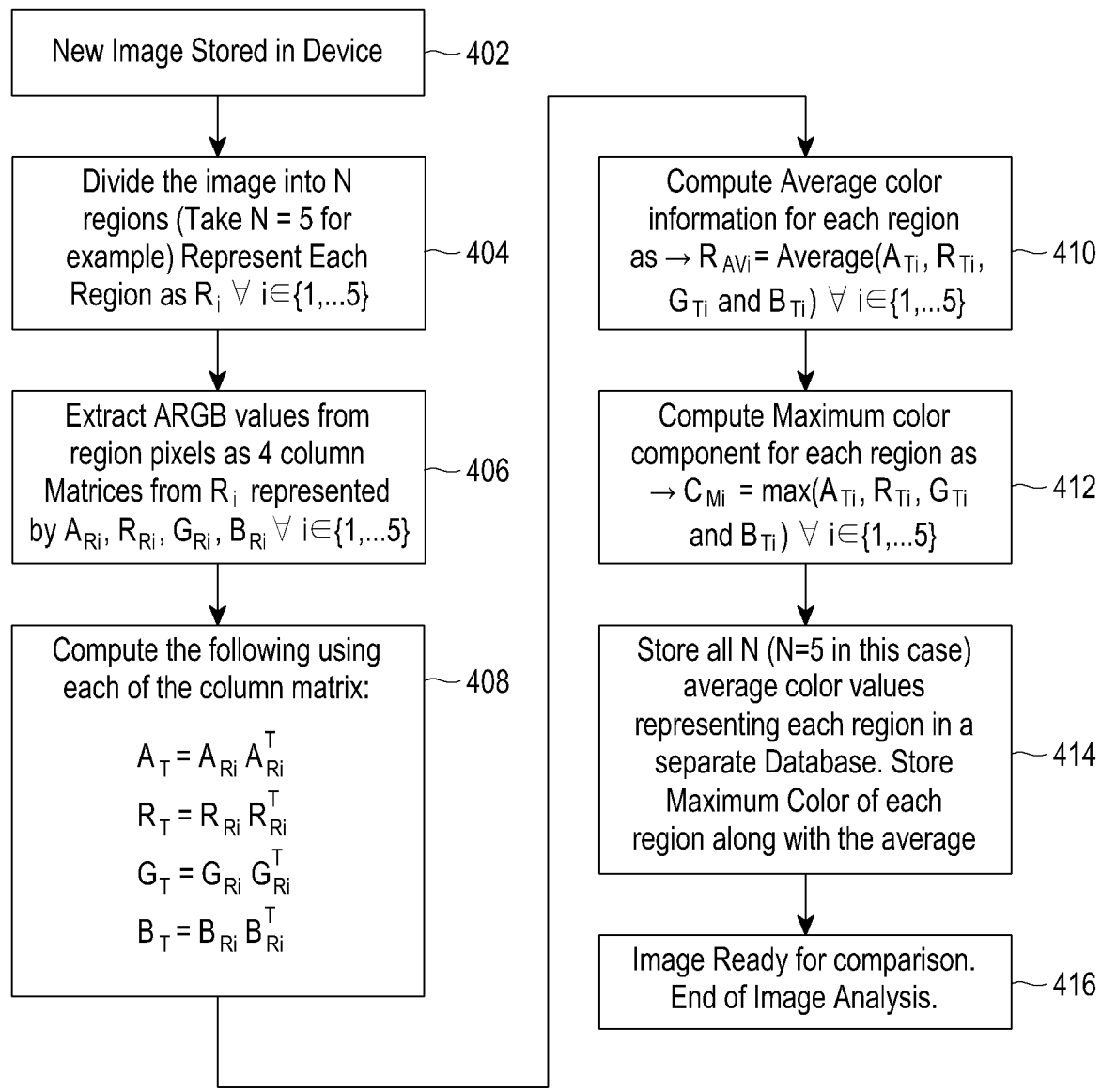
FIG. 4 illustrates a flow diagram, in accordance with an embodiment.

FIG. 4 illustrates a flow diagram with respect to FIG. 1. More specifically, the present steps exemplarily represent step 104 and a functionality of the image processing module 206.

At step 402, image being captured through the device camera is monitored and detected.

At step 404, the captured image is divided in N smaller regions (N=5 for example) and corresponds to representation depicted in FIG. 3. Such division accordingly facilitates an individual comparison of each region (out of the N regions) and does away with the computation of an entire image in a single pass, thereby reducing processing time and leading to more accuracy in results.

At step 406, with respect to each of the regions (i.e. R1, R2 . . . R5), alpha red green blue (ARGB) values are extracted from the pixels and represented as column matrices. In the ARGB (word-order) encoding the intensity of each channel sample is defined by 8 bits, and are arranged in memory in such manner that a single 32-bit unsigned integer has the alpha sample in the highest 8 bits, followed by the red sample, green sample and finally the blue sample in the lowest 8 bits. The alpha byte indicates how opaque each pixel is and allows an image to be combined over others using alpha compositing, with transparent areas and anti-aliasing of the edges of opaque regions.

At step 408, four numbers representing A,R,G,B respectively are extracted. In an implementation, the same may be achieved by performing a matrix multiplication of column vectors with their transposes or by simply averaging the elements of each column matrix. Matrix multiplication can be achieved as follows:

$$A_T = A_{Ri}A_{Ri}^T R_T = F_{Ri}R_{Ri}^T G_T = G_{Ri}G_{Ri}^T B_T = B_{Ri}B_{Ri}^T$$

At the end of present step 408, A, R, G, B values for any region out of all regions (i.e. R1, R2, R3, R4, AND R5) are represented by a single number each ($A_T, B_T, G_T$ and $R_T$ are all integers).

By simply taking an average value, the values of AT, RT, GT and BT can be obtained according to the following equation:

$$A_T = \frac{1}{n}\sum_i^n a_i,$$

$$R_T = \frac{1}{n}\sum_i^n r_i,$$

$$G_T = \frac{1}{n}\sum_i^n g_i,$$

$$B_T = \frac{1}{n}\sum_i^n b_i.$$

The $A_T$, $R_T$, $G_T$, and $B_T$ values are calculated for each region, and the similarity of images can be determined by comparing the values of all regions included in the images.

At step 410, the four values (for every region) obtained in step 408 are further averaged to obtain the average region color (ARC) information. At the end of the present step 410, N region color average information values are obtained, each of which represent the average color information of a region in the image.

At step 412, out of the four values ($A_T$, $B_T$, $G_T$ and $R_T$) (for every region) obtained in step 408, a maximum region color value is obtained. At the end of the present step 412, the process obtains N region maximum color values, each of which represents the maximum color component (R/G/B) of a particular region in the image.

At step 414, data is stored in N databases, each representing values corresponding to a specific region of the image. The database consists of three entries for each of the regions—Image Identifier, Region Color Average Value ($R_{AV}$) and Maximum Region Color component value ($C_{MX}$).

Having obtained the values at step 412 and 414, step 416 denotes a state wherein the image is ready to undergo an analytical operation through an analyzer (208) as a part of step 104.

Figure 5:
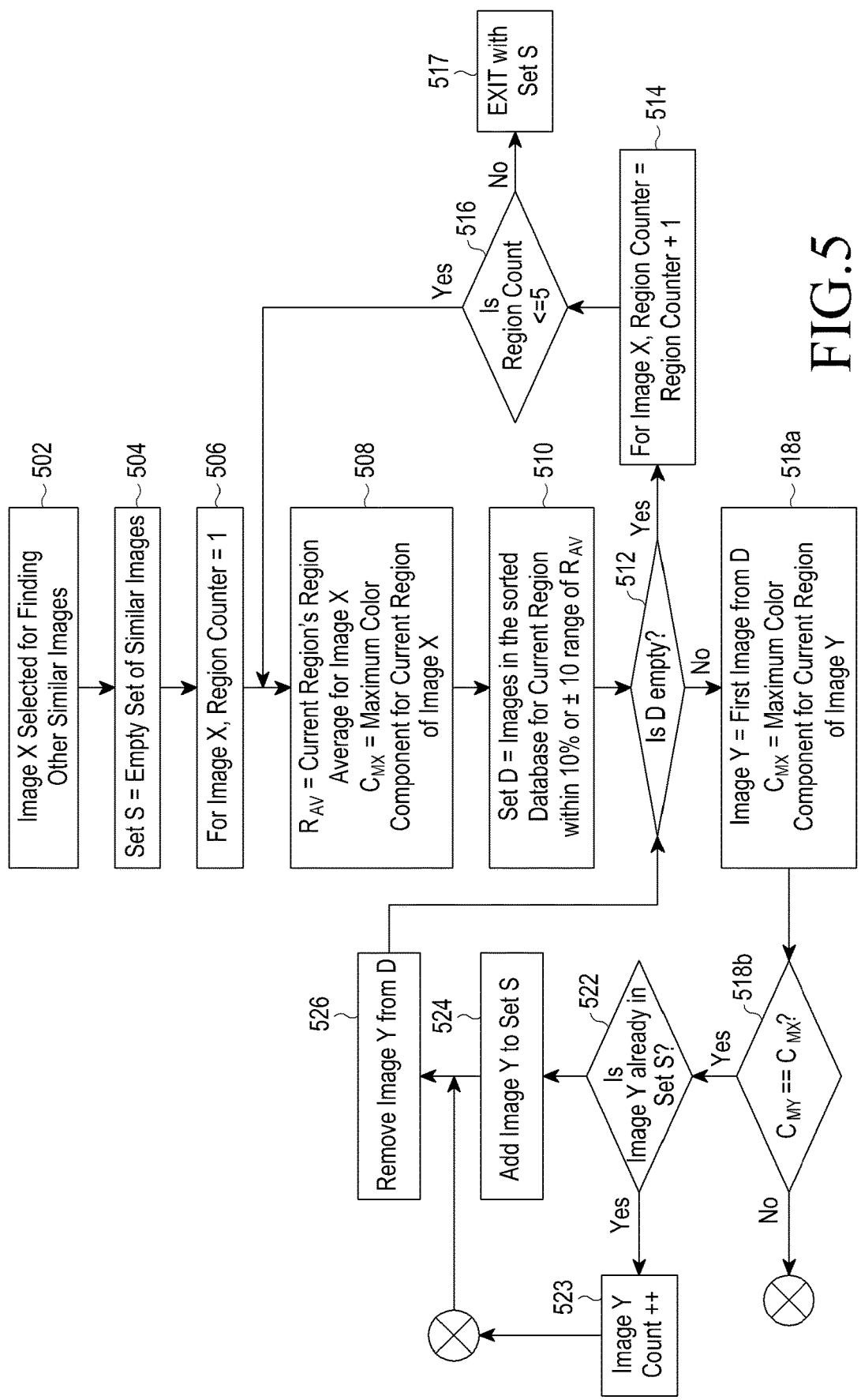
FIG. 5 illustrates a flow chart, control flow in accordance with an embodiment.

FIG. 5 illustrates a flow chart with respect to FIG. 1. More specifically, the present steps exemplarily represent step 104 and a functionality of the analyzer 208.

At step 502, the control flow is initiated, when the color information of an image ($R_{AV}$ and $C_{MX}$) are saved in the database.

At step 504, an empty List/Set S is considered. This list holds objects that comprise of an "Image identifier (ID) and an "Intersection count".

At step 506, the Region Counter 'i' is set to 1. This counter facilitates selection of the 'region based databases' one by one starting with the Region 1 or R1.

At step 508, $R_{AVXi}$ and $C_{MXi}$ for image ID 'X' is retrieved. $R_{AVXi}$ represents the Region color average for Image X for Region i. [i=region counter].

At step 510, all image IDs with average region color values as ($R_{AVXi}+10$) and ($R_{AVXi}-10$) are obtained. This can be achieved by a process called 'Virtual Insertion'. Each $R_{AVXi}$ is inserted in a corresponding region database (say R1 database). For example, region databases may be standardized such as R1 database, R2 database etc. Accordingly, $R_{AV1}$ with respect to the image under consideration may be inserted to R1 database.

The position of insertion of both the limits ($R_{AVXi}+10$) and ($R_{AVXi}-10$) are marked. Accordingly, all database entries lying between these two indices are selected for further evaluation. All discovered within this range are assigned to a List/Set D.

At step 512, If D is found to be empty, then Region Counter is incremented by 1, i.e. Region Counter=Region Counter+1 through step 514. This implies moving to compare the next region. In step 516, it is checked if Region Counter≠N, then control is transferred to step 508. Else, the control flow ends and the current state of set S is considered through step 517.

However, at step 512, If D is not found to be empty, then the max color components, i.e. $C_{MYi}$ of the image Y in set D is considered through step 518a and compared with $C_{MXi}$ through step 518b.

All entries from D that do not have the $C_{MYi}$ as equal to $C_{MXi}$ are removed via step 518b. In such a scenario, the control flow proceeds to step 526. The remaining entries i.e. Image IDs are added to Set S.

At step 522, if an Image ID already exists in Set S, then its 'occurrence-count' is incremented by 1 through step 523 and thereafter the control is transferred to step 526.

At step 526, the image Y under consideration is removed from set D. Thereafter, the control is transferred back to step 512 to ascertain if set D has any further similar image 'Y'.

However, at step 522, in case the image does not exist in set S, then the image Y is added into set 'S' via step 524 and the control flow proceeds to step 526.

After one or more iterations, the finally obtained set S now comprises all the image IDs (and their occurrence counter values) that have the Region color averages within a specific range of Image X and have the matching Max Region Color component values. Accordingly, either all of the image IDs in set S may be taken into consideration or the image IDs may be shortlisted out of the set S by procuring only such image IDs that have had occurrence count as more than N/2+1.

Such proposed value for 'occurrence count' limit lends optimization to the final results, as have been duly-evaluated during the experimentation. Accordingly, the 'occurrence-count' controls the sensitivity of the control flow and is presented as a control-setting. In other embodiment, occurrence count with respect to specific regions may be given preference ahead of other regions. For example, an occurrence count with respect to regions 3 and 5 may be a yardstick to determine the image is closely similar as compared to regions 1 and 2. In such a scenario, even a low occurrence count may be used to shortlist an image out of set S, provides that the same is with respect to designated regions.

Figure 6:
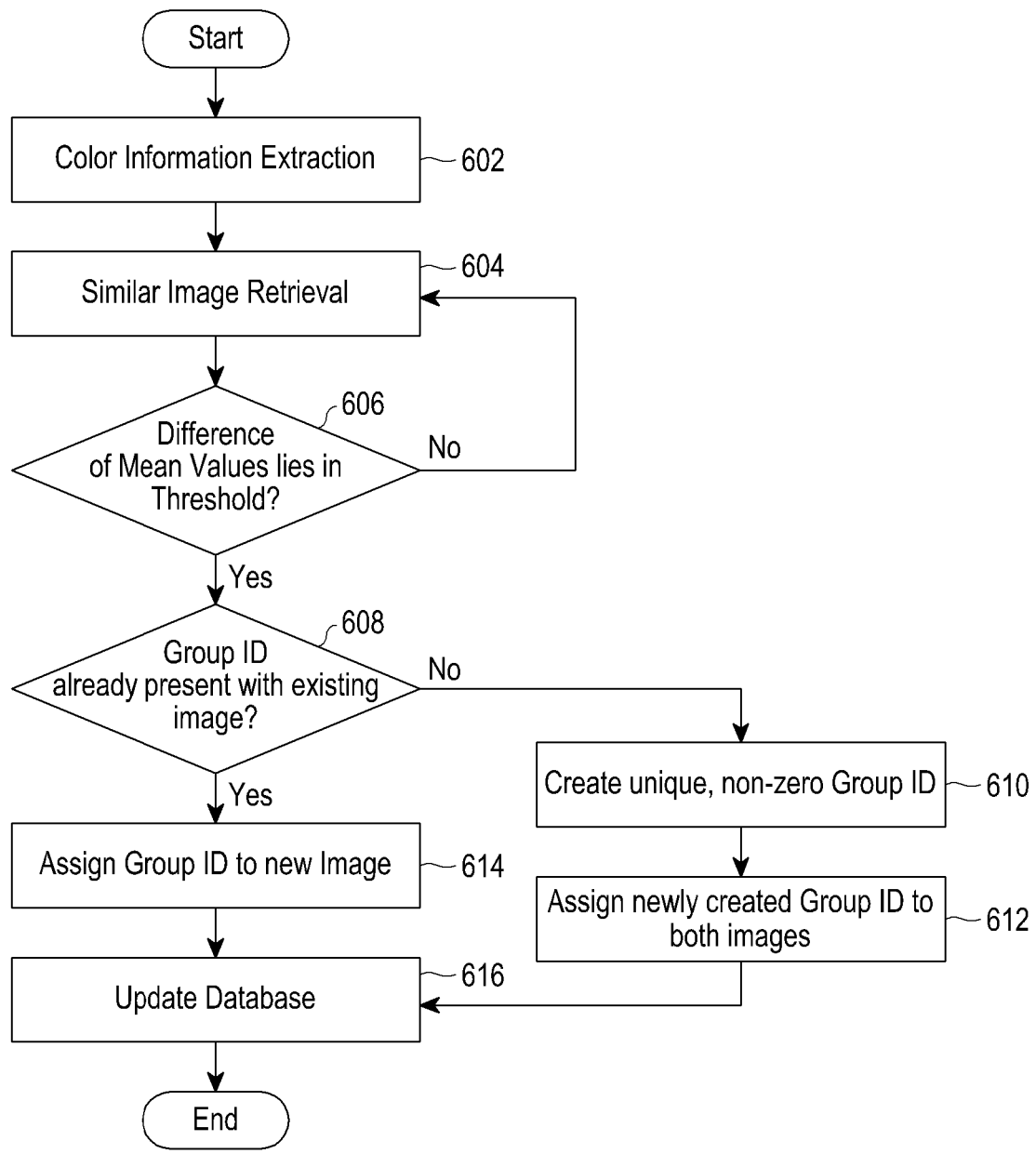
FIG. 6 illustrates a flow chart, control flow in accordance with an embodiment.

FIG. 6 illustrates a flow chart of an implementation, in accordance with an embodiment. More specifically, the present implementation aims at awarding an image group identifier ID to the image 'X'.

At step 602, the color-values (RGB) of the image X are extracted and indexed. The extraction may be based on the description provided with respect to FIG. 4. This condition occurs with respect to occurrence of a 'new image' within the computing device, which may be due to clicking of a new image by a user, insertion of an SD card with new images, etc.

At step 604, a similar image matching criteria (as discussed in FIG. 5) is initiated.

At step 606, if difference of Mean RGB pixel value of 2 images lies within Threshold value (−10<=T<=10), then the two images being compared are considered as similar. Else, the current step is executed for next image in the gallery/database for checking similarity with the image 'X'.

At step 608, it is checked if any group ID is associated with the image found as similar. If yes, then same group ID is associated with image X under consideration via step 610. Thereafter, the database is also updated through step 612.

However, if at step 608, no group ID is found to be associated, then a unique 'non-zero' Group ID is created with respect to step 614 and the newly created Group ID is allocated to both the image X and the found similar image, that has been found to be not having any Group ID. Again, the database is updated through step 616.

Figure 7:
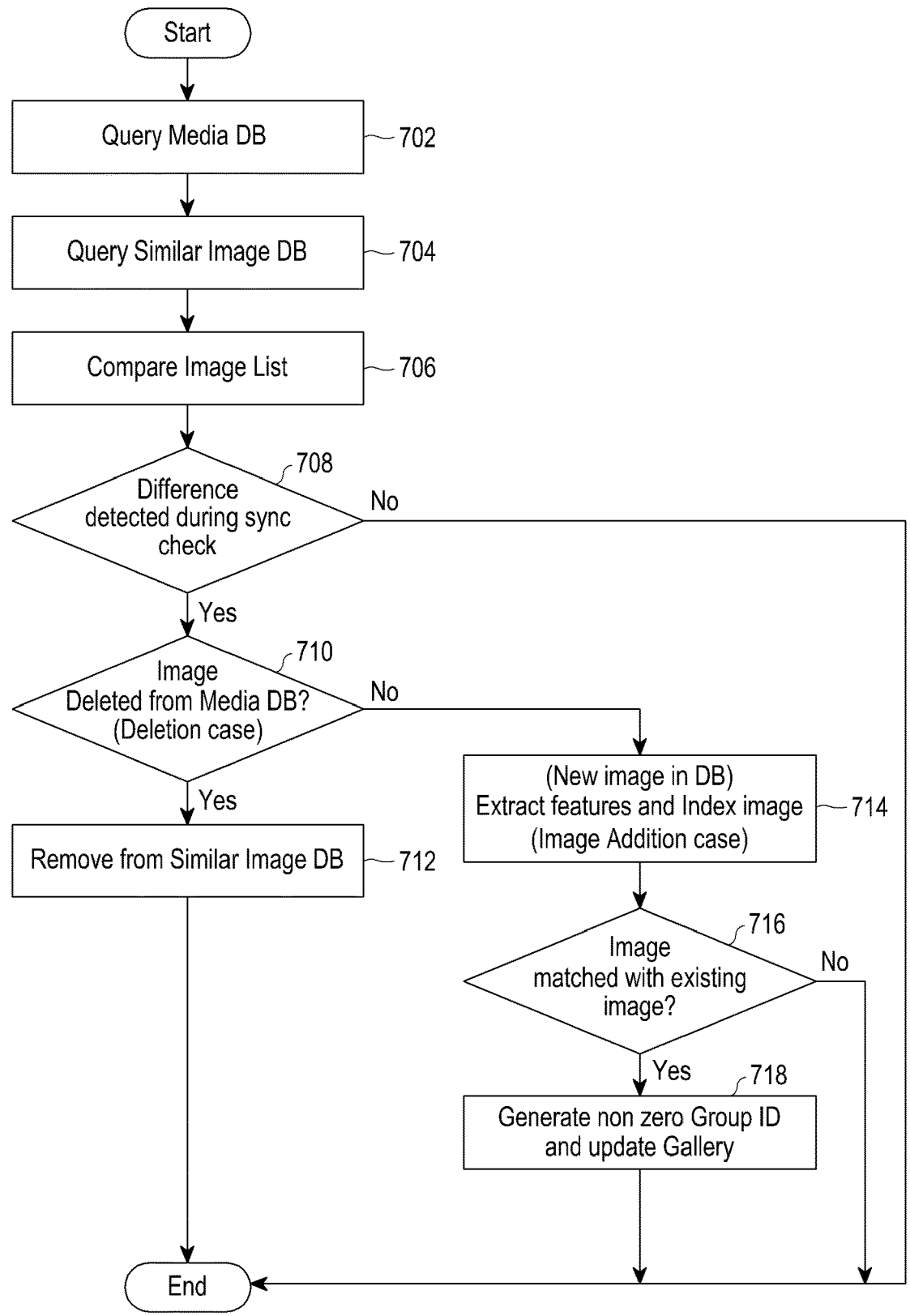
FIG. 7 illustrates a flow chart, in accordance with an embodiment.

FIG. 7 illustrates a flow chart, in accordance with an embodiment.

In FIG. 7, the computing device performs an automatic synchronization process between the image database (e.g. a Gallery application) and the similar image database 'S' as has been created via the description of FIG. 5. More specifically, the process depicted in FIG. 7 describes a control flow to periodically detect additional-images within the 'image database' after having periodically synchronized the same with another database referred as "similar image database".

Steps 702 and 704 depict the fetching of image database and similar image database, respectively.

Step 706 represents a numerical comparison between the number of images in both databases.

Step 708 represents depicting a difference between numbers as an outcome of decision making in step 706. In case no difference is detected, then the process terminates instantly. Else, the control flow proceeds to step 710.

Step 710 represents the scenario, wherein it is checked if the similar image database has an additional image than the image database. If yes, then such additional image is also deleted from the similar image database via step 712, because the additional image as found in the similar image database is not anymore in the image database. Thereafter, the process terminates.

However, if at step 710, it is ascertained that the additional figure is present at the image database, then a group ID is allocated to the identified image as described within the description of FIG. 6. Steps 714 (extraction of color values), 716 (matching of images) and 718 (final allocation of group ID) correspond to such description of FIG. 6. Thereafter, the process terminates.

Figure 8:
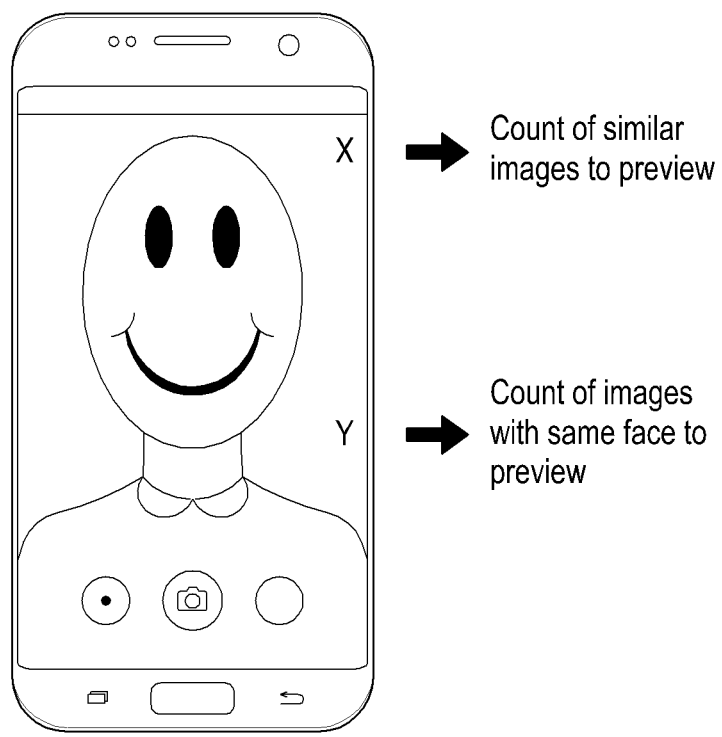
FIG. 8 illustrates an implementation, in accordance with an embodiment.

FIG. 8 depicts an implementation, in accordance with an embodiment. More specifically, the present implementation depicts a scenario, when user is viewing an image whose similar images have been already found and the group ID stand allocated to the image under consideration.

Based on grouping of similar images together, a count of similar images is displayed at the top as 'x' and the bottom as 'y'. While 'x' represents the count of 'identical' images, 'y' represents a count of non-identical images but having a same face representation as that of the person shown in the currently displayed image.

FIG. 9 represents an implementation, wherein an ease of navigation is rendered through the similar grouped images. More specifically, control options may be rendered for the navigation across similar images.

In an example, as shown in (a) of FIG. 9, the gestures may be enabled such that a vertical gesture such as a 'swipe-down' or 'swipe-up' gesture when executed upon a 'currently image may be used to navigate to next/previous image of "same" face. More importantly, while such image is irredundant or distinct with respect to the current image, it still corresponds to the face representation in the previous image under consideration. Further, the topmost count also changes from 'x' to 'z' for the irredundant figure, because z now represents count of similar or identical images with respect to the irredundant image.

On the other hand, as depicted in (b) of FIG. 9, "Swipe Left" and "Swipe Right" based 'horizontal-gesture' when executed upon the image will be used to switch to next/previous similar or identical image.

Overall, while the horizontal swipe achieves navigation among the identical images, the vertical swipe leads to navigation among the non-identical yet related images. Conventionally, when a user sees an image through 'full-screen' mode, it is difficult to skip similar images and switch to next irredundant image as one has to resort to a step by step shift from one image to another in a sequence.

FIG. 10 illustrates an implementation, in accordance with an embodiment. More specifically, the present implementation depicts the scenario of an auxiliary device such as a smart watch, wherein the touch sensitive surface and the display area is substantially smaller than the main computing device.

As illustrated in (a) of FIG. 10, the different faces as present within the image database (i.e. Gallery) are displayed as a part of preview of gallery. When some face is focused by a 'bezel' rotation, the device displays count of similar images of that face by a numeral (e.g. 12) on the Top Left side. If user clicks on this option, device displays list of similar images of that face. Also, the device displays total images in which that face is present by depicting another numeral (e.g. 7) in Bottom Left side. The user can tap on either of these numerals to check all the images in which this individual face is present. The device also displays memory consumed by the similar images of that face (e.g. 49 MB). The user can tap on this 'memory size' based option to 'delete' all the similar images and free the memory.

As illustrated in (b) of FIG. 10, when the user selects a face from the previous screen i.e. (a) of FIG. 10, the device displays the main image (selected face) at the center. The device checks and provides all the connected faces (or secondary faces) on the boundary around main image. Here, the connected face means there is at least one image in which these 'two-faces' are present together. When, the focus through 'bezel-rotation' is made on any of the connected face, the device displays 'similar-images' count for both persons (main and the secondary image) by a numeral (e.g., 3) on Top Left. A count of total images in which both persons are present is displayed as another numeral (e.g., 7) on the Bottom Left corner. Again, a total memory size consumed by similar images of these two persons is depicted by another numeral (e.g., 14.6 MB) at the top-right of the secondary image. Again, such memory size can be clicked to remove such similar images.

A user can simply tap on the consumed memory size in order to free memory. Accordingly, instead of exploring complete gallery, the user is able to delete the similar/redundant images directly. This is very helpful as few images of certain faces can be of low priority for end user. Instead of exploring complete gallery, the user is able to delete those images directly.

Figure 11:
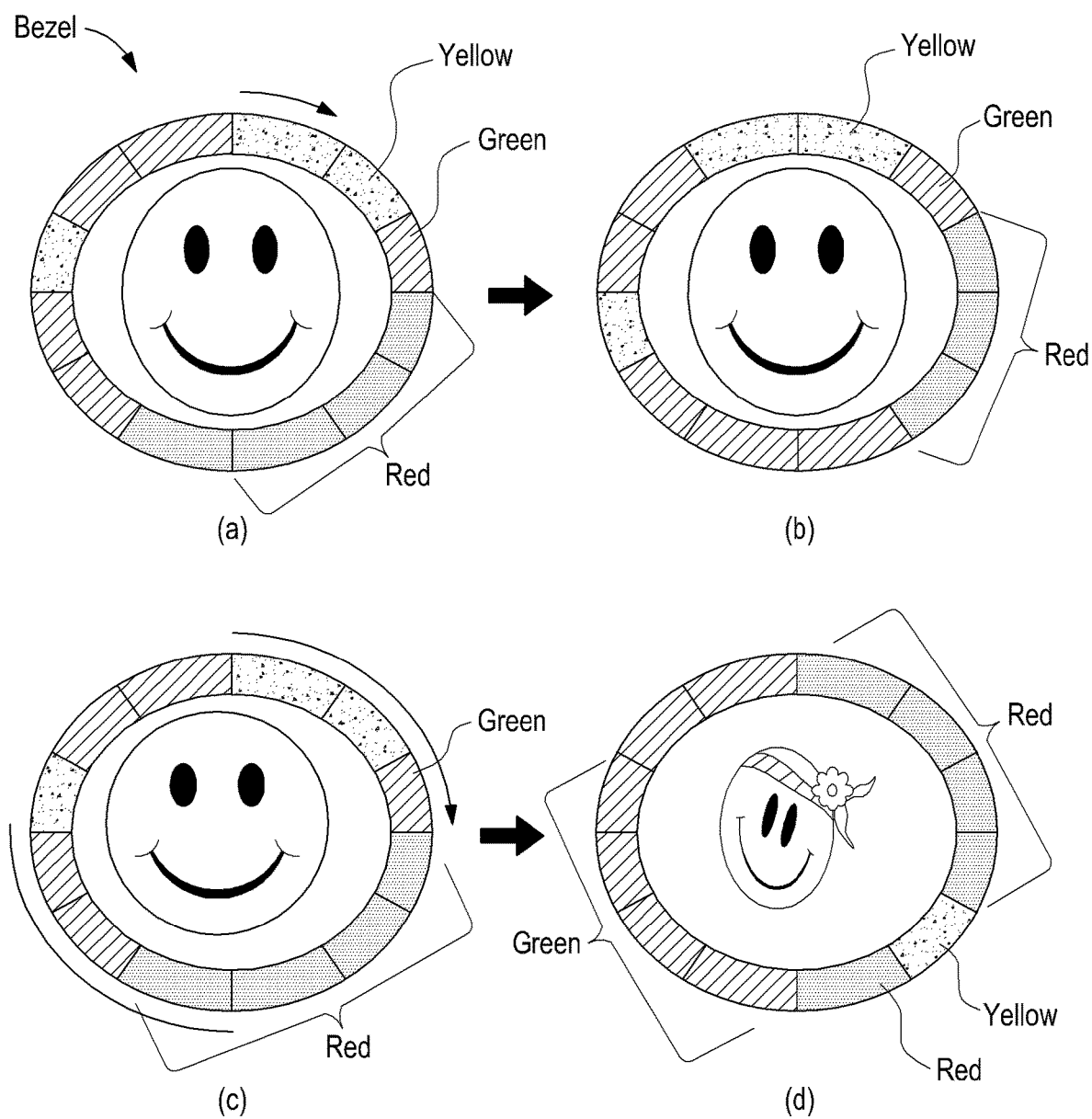
FIG. 11 illustrates an implementation, in accordance with an embodiment.

FIG. 11 illustrates an implementation, in accordance with an embodiment. More specifically, the present implementation again depicts the scenario of an auxiliary device such as a smart watch.

A depicted (a)-(d) of FIG. 11, at the bezel of smart watch, the user is displayed information of next six images and previous six images as per the current image. Information is divided in three categories: Similar Image, Same Face, Different Face.

As mentioned before, the information of each image, indexing and Group ID is present in the 'Similar Images' Database. When the user opens an image in smart watch, the device fetches the information of next and previous six images. Based on the index and Group ID of each image, information from Similar Images Database is fetched easily. The device categorizes these images in three parts: a.) Similar image. b.) Same Face but irredundant image. and c.) Different Face and irredundant image.

Based on the differentiation, the device displays these with three colors (e.g., Yellow, Green and Red) respectively. A circular boundary is created near to bezel and is divided into 12 parts. 6 parts in the right of vertical 'semi-circle' display information of next 6 images as per the current image. 6 parts in the left of the vertical 'semi-circle' display information of previous 6 images as per the current image. As per the color displayed on each part, user gets notified about next and previous images. This becomes very useful for the end user as the screen area based user interface of the 'Smart watch' is very small.

As depicted with respect to (a) in FIG. 11, the bezel rotation is imparted to the smartwatch with a magnitude of '1' to arrive at a yellow mark. Accordingly, the next identical or similar image is displayed at (b) of FIG. 11. The bezel-information also changes accordingly.

As depicted with respect to (b) of FIG. 11, the bezel rotation is imparted to the smartwatch with a magnitude of three to arrive at a red mark. Accordingly, the next irredundant image of the same person/face is displayed. Again, the bezel-information also changes in accordance with the arrival of the irredundant image.

Figure 12:
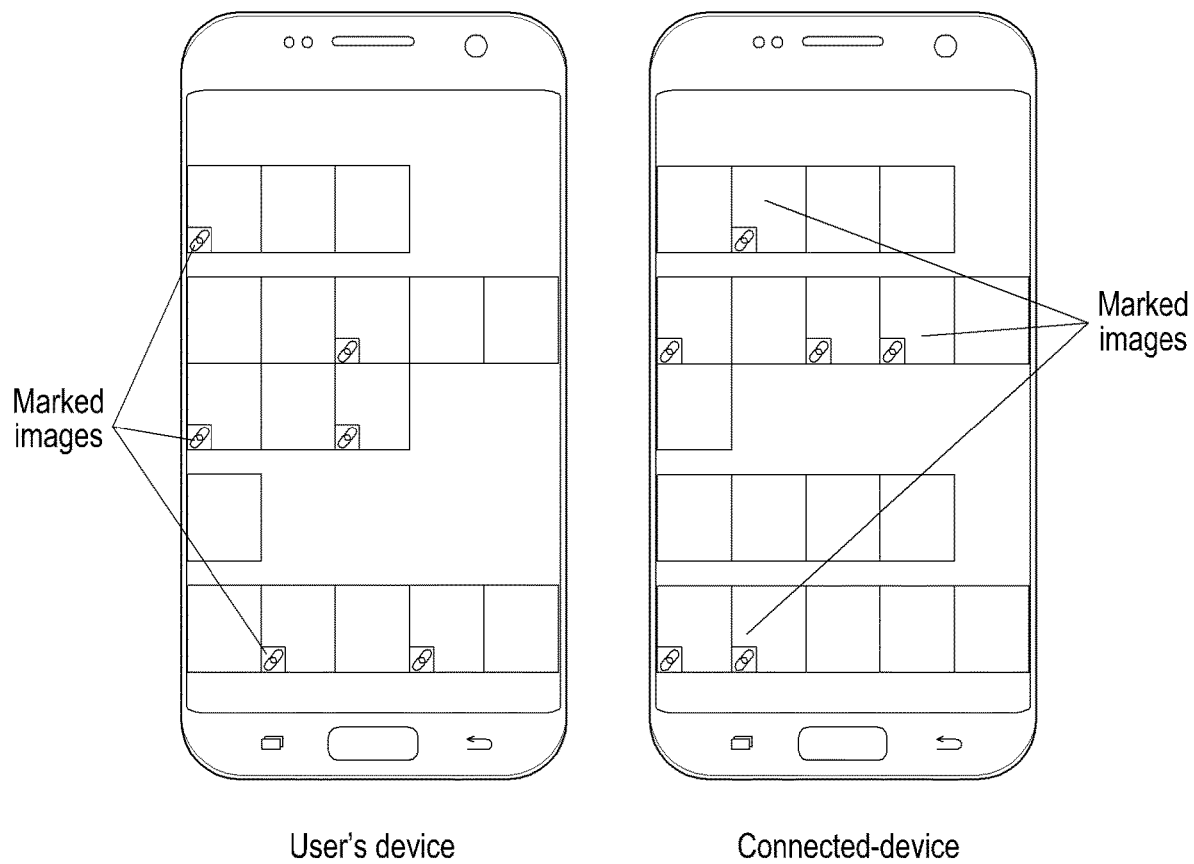
FIG. 12 illustrates an implementation, in accordance with an embodiment.

FIG. 12 illustrates an implementation according to an embodiment. The present implementation pertains to multiple devices of group members or family members, wherein the presence of similar images in the networked device leads to redundancy and accordingly needs to be avoided. For example: in a family, there are two members and two devices. There are 30 family images which are present in each device. Each image is of 5 Mb, hence total 30*5=150

Mb consumed in each device and in total 150*2=300 Mb consumed in the two devices.

At least in order to redress this issue, an option may be provided in the menu of each of the connected devices as "Check same images in connected device". When user selects this option, the device notifies same images (between user's device and connected device) with a mark on the image. Within the mark, Yellow color represents 'same' images and 'grey' icon represents 'connected devices'.

As illustrated in the present FIG. 12, the user can clearly see that 'six' images are common in his and connected device. Accordingly, the user may be offered an option "Transfer to Family External Storage". This option allows saving of only one copy of these same images in external memory (SD card, cloud, etc.) and removal of images from all of the connected and current device. For each of the action, authentication will be required in each of the connected devices, thereby addressing any security constraint. All of the connected devices may be provided with a shared-link of external memory storage after the transfer is complete.

Figure 13:
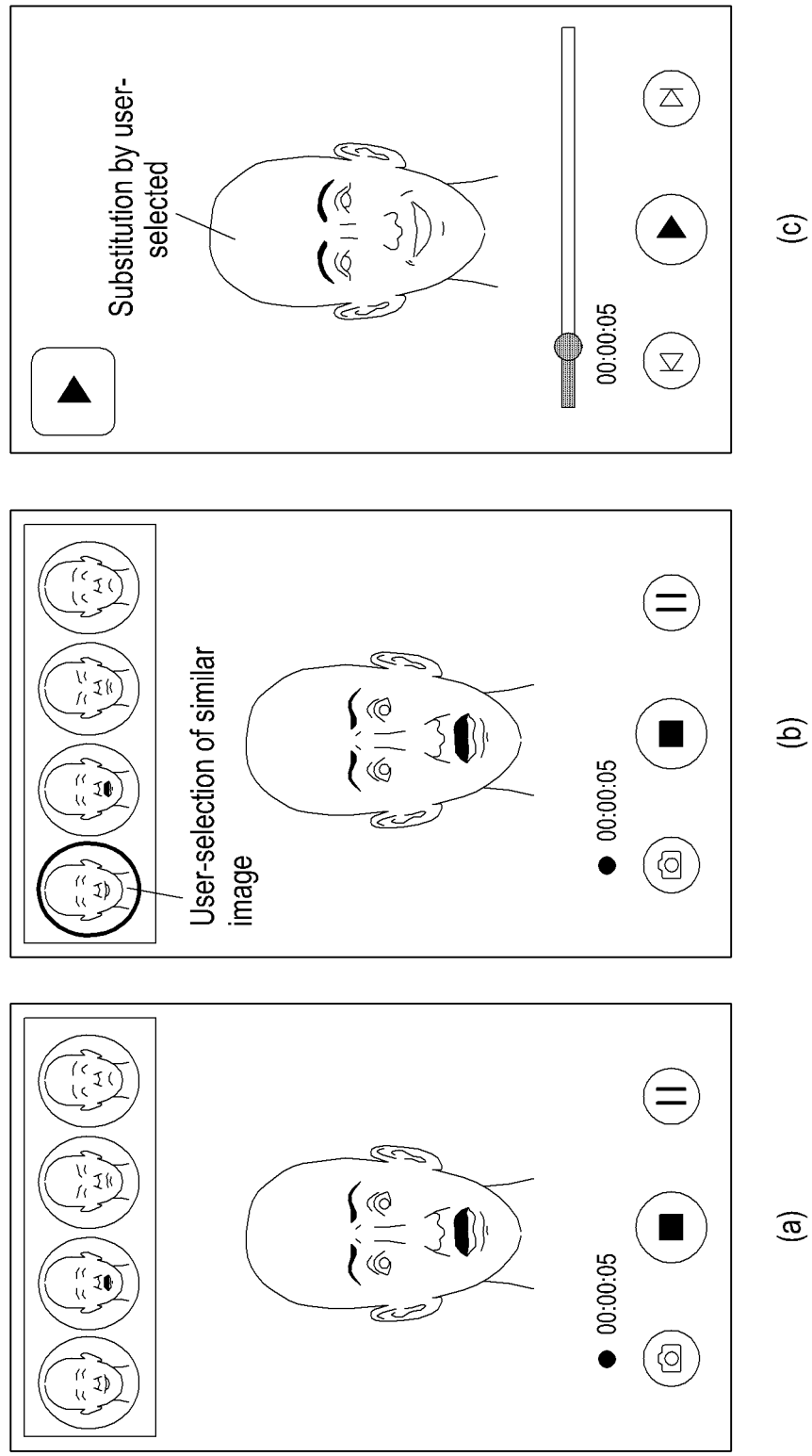
FIG. 13 illustrates an implementation, in accordance with an embodiment.

FIG. 13 illustrates an embodiment, according to an embodiment.

The present implementation is based on a premise that the user is provided dynamic suggestions (at run time) while checking a camera application. The device displays count of similar images to camera frame on the top and the count of the images containing 'same' face at the bottom. In operation, as the user opens a camera application, a camera frame is rendered on screen. The information of current camera preview is matched with the database by applying similar image matching criteria as discussed in FIGS. 3 to 5. Based on the matching results, the device displays a count of similar images and 'same' face images at top and bottom, respectively. In this way, the user is displayed information during run time and redundant camera clicks can be avoided. More specifically, such images are prevented from getting captured that are more or less already present within the mobile device.

Such camera preview based image batching is also applicable while creating 'video' through the camera, as depicted in (a) of FIG. 13. Based on the person being shot in the video, the mobile device displays suggestions of similar images in respect of person in the video frame. The user can select the suggestion (as shown in (b) of FIG. 13), such that these changes will be done automatically by the device after a completion of video.

More specifically, upon selection of the suggestions by the user from a set of similar images, the device stores that suggestion with respect to 'time-interval' of the video frames. The user can select similar image for various different video frames. When user completes shooting the video, the device performs the switching of specific frames with the selected similar image options. On the UI, user is displayed "Applying Effects". When the switching of all the required frames is completed and video is played by the user, the user is displayed-video with replaced similar images, as shown in (c) of FIG. 13.

As the video is formed using multiple frames, the device fetches video frame information just like camera preview and applies a similar image matching criteria. Based on the results, suggestions of the similar images are displayed as per the video frame in (a) of FIG. 13. The user can select any of the provided suggestions. When the user selects a suggestion through (b) of FIG. 13, a key-value pair is stored in the 'Hash Map' collection. The time interval of the video frame which is to be replaced is stored as "Key" and selected similar image suggestion by user is stored as "Value" in the Hash Map collection. The user can select similar image suggestion for multiple different video frames and entry is made in the Hash Map every time. After completion of video, device displays message "Applying Effects" on the user interface (UI) for few seconds, in order to depict an ongoing video processing. On the backend, the device picks the entry from the Hash Map one by one. For each "Key-Time", the video frame present in that time is replaced by "Value-Selected Similar Image Suggestion". When all the entries of 'Hash Map' have been replaced, the editing is complete. Now, when the user plays video in video player application, he is displayed 'edited-video' as illustrated in (c) of FIG. 13.

Figure 14:
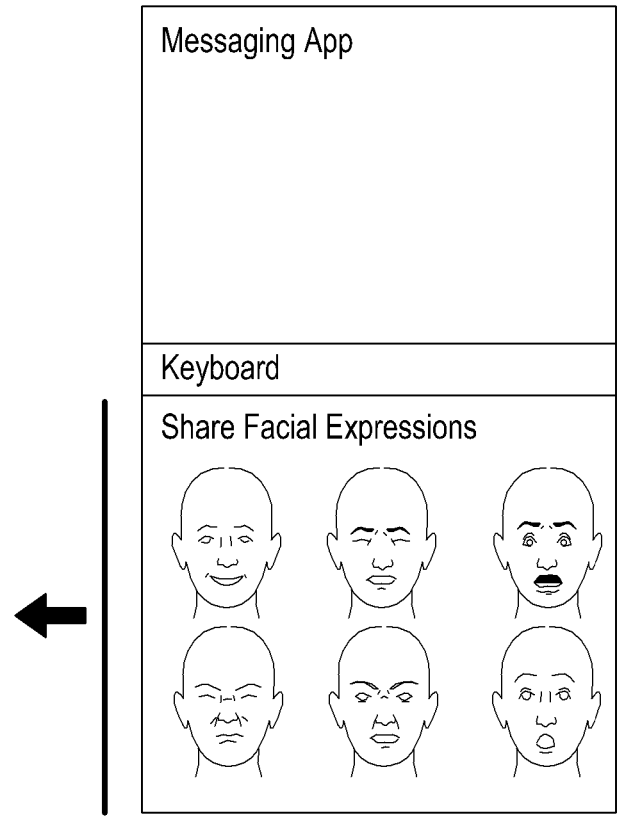
FIG. 14 illustrates an implementation, in accordance with an embodiment.

FIG. 14 illustrates an implementation in accordance with an embodiment. Multiple images can be associated with a face. Multiple similar images may result in different expressions related to that face. These expressions can be used to evaluate the mood of person. Accordingly, the user is able to select the expression/mood of the person from an image and instantiate the same in another one.

A gesture of 'long-tap' may be executed upon the face of a person. When user long taps on the face of person, other expressions related to that person are fetched/extracted from the stored images and displayed on-screen. Such expressions can be further used to display face images containing the extracted expressions that can be used to edit the main image. Furthermore, the expression based face image may be shared, may be used to depict status on social media, etc. Moreover, instead of depicting all expressions with respect of the main image, only certain expression based face images may be shared that are in-line with the expression of the current image under consideration.

Figure 15:
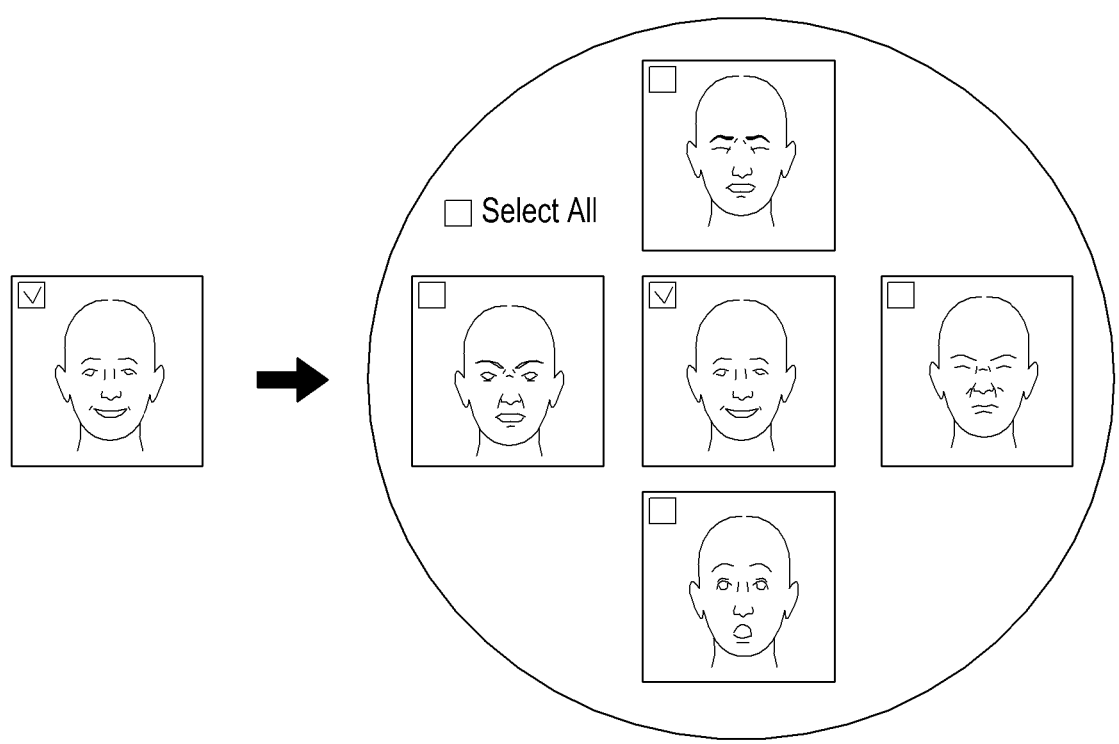
FIG. 15 illustrates an implementation, in accordance with an embodiment.

FIG. 15 illustrates an implementation according to an embodiment. When a user makes a 'Long tap' gesture, a particular image is selected. As the device already has a complete information for each image in the 'Similar Images' database, an information bundle of similar images is fetched automatically. A customized circular view is formed and displayed on-screen. The selected image is placed at the center and rest of the similar images are placed at the boundary. Also, an option is given to select all the similar images. In this way, user can easily select the similar images and delete/retain the images as per his discretion.

Figure 16:
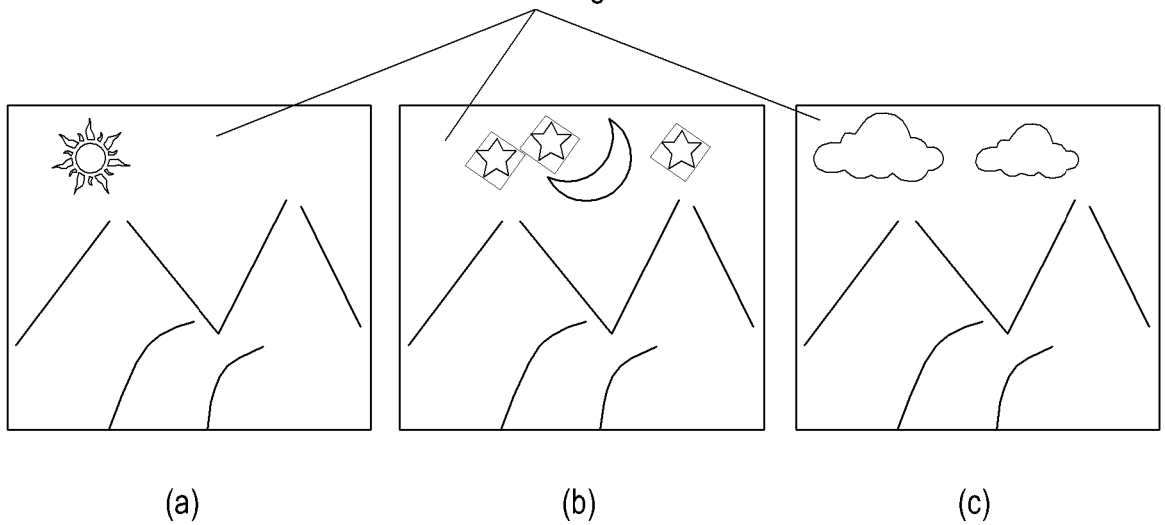
FIG. 16 illustrates an implementation, in accordance with an embodiment.

FIG. 16 illustrates an implementation according to an embodiment. More specifically, the present implementation depicts adding intelligence to 'Wallpapers' that are actually substantially similar images with respect to each other. Whenever an user sets a wallpaper, it shows their interest and preference for that kind of images as wallpaper. The device intelligently picks the points from wallpaper like: a.) "Orientation of Image". Landscape or Portrait. b.) "Theme associated with the Image". Example Party Theme, Festival etc. c.) "Objects present in the image". Object can be a Face, Food, Scenery etc. d.) "Normal click or Selfie". and e.) "Brightness".

Based on the picked points, the device detects the similar images present in the device. This enables the device to automatically switch to a new similar image based wallpaper after a certain time period, which can be customized by the user. In this way, the user's efforts and time is saved and required change in wallpaper is made automatically. Likewise, the wallpapers may also be switched manually based on one or more of wallpapers provided as suggestions.

Likewise, though not represented diagrammatically, another implementation of the present subject matter represents "Smart Merge". Such a technique aims at a unique method to save memory and create a hybrid image from a set of similar images. The user is displayed a list of similar images. With the list, an option to Merge all similar images into a perfect shot is given. If user clicks on the Smart Merge option, good factors from all similar images are picked and used to form a perfect hybrid shot.

According to an example, a user may have captured three different images to get a nice photo but none of them is perfect as per the requirement.
Image 1:
Good factor is Brightness on the face of user.
Bad factor is Red eye due to use of Flash light.
Image 2:
Good factor is Expressions of the user.
Bad factor is Angle of face.
Image 3:
Good factor: Angle of the face.
Bad factor: Blurred image in background. (Photo bomb)

Hence even after clicking 3 images, a user is not happy. There are some problems in every image and at the same time, there are some good points in each image. When user taps on the option of Smart Merge, device will pick all the good factors like Brightness, Face Angle, Expressions of user and remove factors like Blurred background, Red Eye to form a hybrid image. This hybrid image is formed by combination of all the similar images (Good factors of every image). This hybrid shot may be displayed. If user likes this hybrid shot, it is saved and rest all of the similar images can be deleted to save memory.

Yet, another implementation of the present subject matter may be "Quick-Video Snippet". In this implementation, the device automatically detects all the good images from the similar set of images and create a quick video from those selected images.

Yet, another implementation of the present subject matter may be "Single Tap Cleaning". A button is displayed on screen. When user clicks on it, the device automatically detects duplicate and similar images in the device. All the duplicate images are removed from the device. Also, intelligent best picture recognition is applied on the similar set of images. The best picked image is kept and rest all other similar images are deleted automatically. After cleaning the duplicate and similar images, user is displayed the memory saved by a single touch. Accordingly, an automatic cleanup operation in the device is done.

Yet, another implementation of the present subject matter may be "Smart Folders based on Events for Smart Reply". During the festivities, a user gets a lot of image based messages. Most of the images contain same text like "Merry Christmas", "Happy New Year" etc. The device fetches all these images of similar category using "OCR" text fetching technique. The device automatically creates a new folder in "Gallery" and keeps all the same category images in that folder. When same event occurs next time, the device notifies the user about the images present related to that event. Here, the device easily fetches the event from the Calendar, Message, Mail apps, thereby benefiting the user in following ways: a.) Smart Reply. When user receives an image message from any contact related to event or festival, the device displays options to share image related to that specific event from the folders (created based on OCR and Event). This saves time for the end user as he does not need to search images in the Gallery. b.) Easy access to user. User can check images related to that event directly from the folder. No need to explore all the images of Gallery. User can delete, share, transfer images easily. c.) User can avoid downloading redundant images related to that event or festival as he will get notified whenever he tries to download images related to that event.

Figure 17:
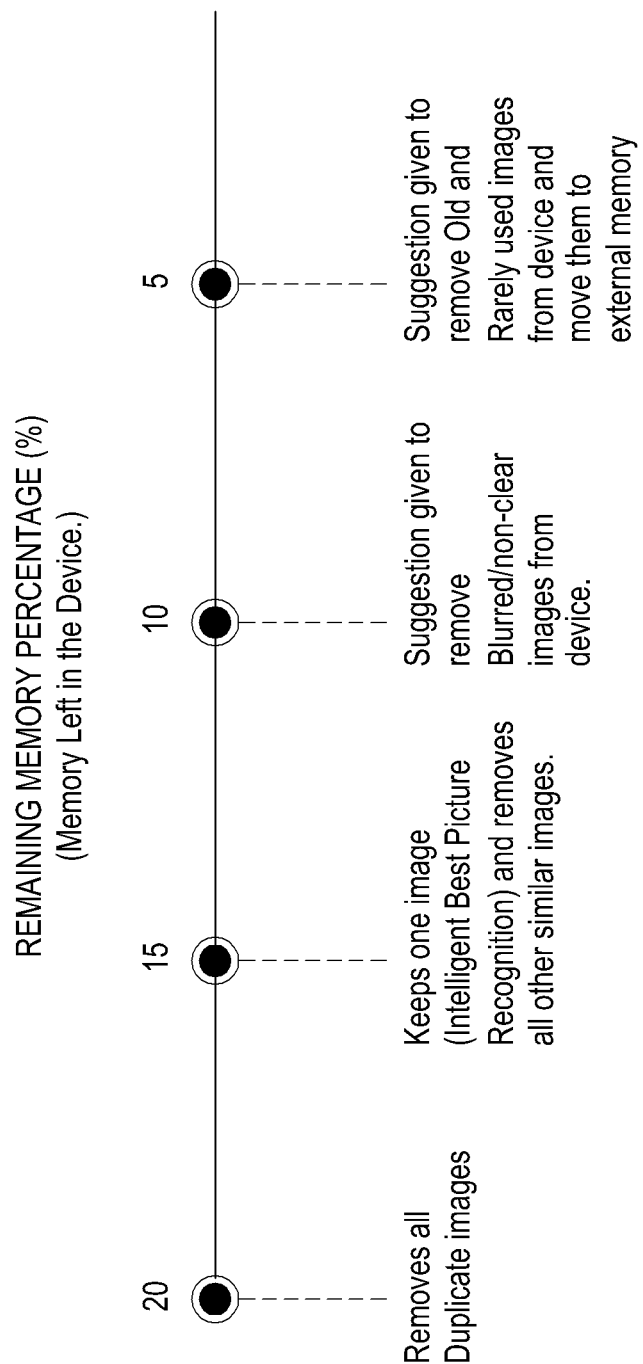
FIG. 17 illustrates an implementation, in accordance with an embodiment.

FIG. 17 illustrates an implementation in accordance with an embodiment.

The present implementation addresses a scenario, wherein the user faces a lot of problems related to memory. As the memory goes low in the device, the user should manually pick the images and delete those to save memory. A lot of user's effort is required and results in wastage of time. The present embodiment provides the user an option in the settings as "Memory Optimization Redundant Image Removal". Upon activating such feature, the device displays slabs of "Memory percentage" (remaining memory) and the actions (to be performed by device) on each slab.

TABLE 1

| Remaining Memory % age (Slab) | Action Performed Automatically |
| --- | --- |
| 15-20 | Keep Original image & Delete Duplicate images |
| 10-15 | Keep one best image from set of Similar images and Delete all other Similar images |
| 5-10 | Suggestion to delete Blurred images. |
| 0-5 | Suggestion to remove Old & Rarely used images and move to cloud. Two factors of time and history usage are taken in this. Because newly clicked images are mostly rarely seen (once). |

As depicted in Table 1, 'actions' in the form of suggestions to delete images are given from 0-10% slab. When remaining battery is 10%, the device gives suggestion to delete blurred images. The blurred (Out of Focus) images may be detected by calculating Sharpness percentage of an image. Sharpness can be calculated easily based on the factors of maximum pixel difference, range of the pixel values etc.

In an example, say 's' is the sharpness percentage of an image. If 's'<40(%), then that image can be taken as blurred (out of focus) and suggested for deletion. When remaining memory is 5%, the device suggests images which are old and rarely used. Two factors of time and usage history are checked. Say an image is "t" days old (captured, downloaded or transferred "t" days ago), used for "u" times. If t>=T (Threshold Time) and u<=U (Threshold usage), then this image will be suggested for deletion automatically.

Figure 18:
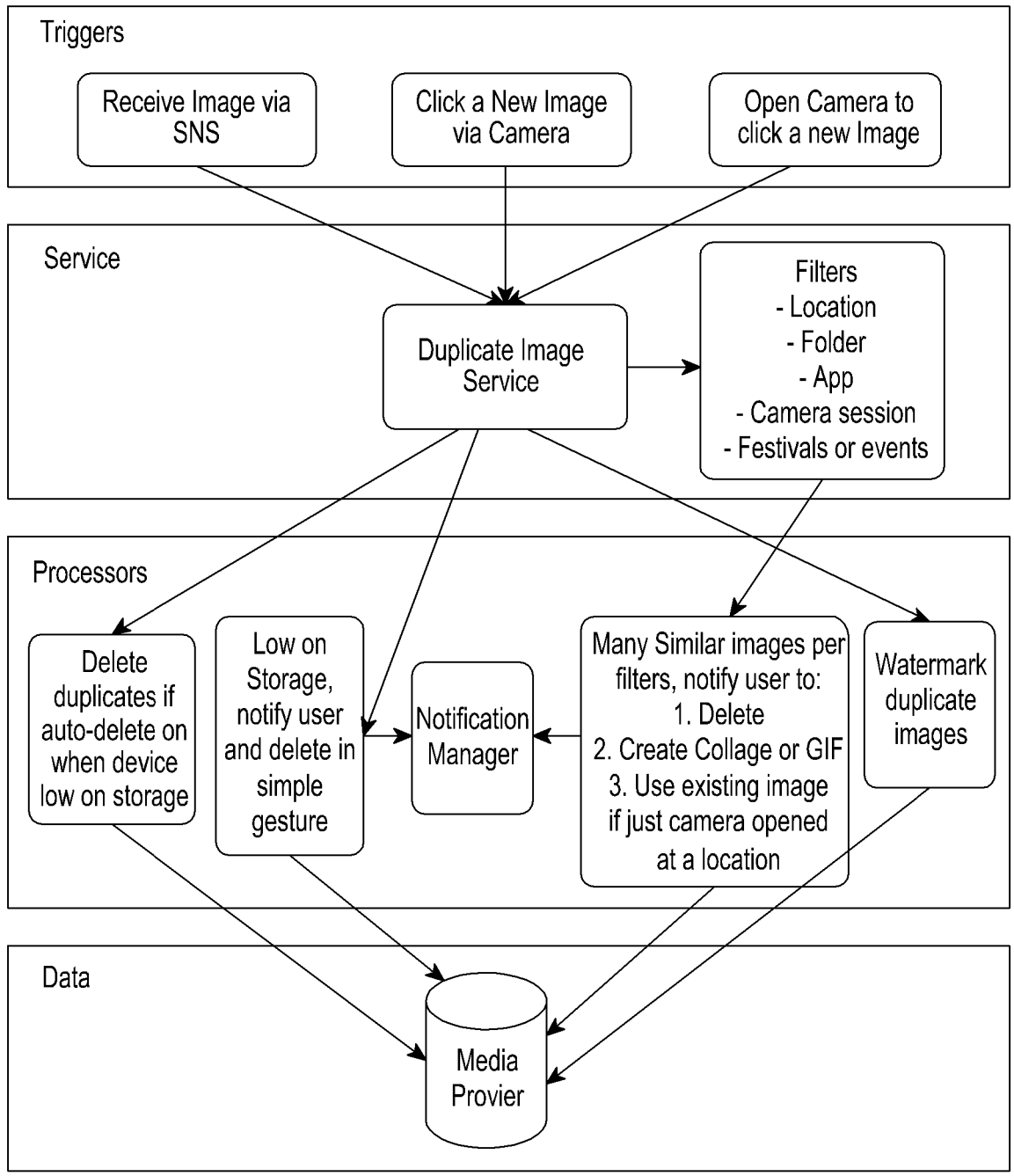
FIG. 18 illustrates an implementation, in accordance with an embodiment.

FIG. 18 illustrates an implementation according to an embodiment. As illustrated therein, the 'triggers' to initiate the operation of the present subject matter may be receiving an image through SMS, capturing by camera, a camera preview of not yet clicked image and accordingly corresponds to receiver module 202 of FIG. 2. Further, the 'service' to find redundant images corresponds to image identification module 204 of FIG. 2. The 'processor' and 'notification-manager' as depicted correspond to processing module 210 of FIG. 2. The 'database' corresponds to gallery and similar image database.

Figure 19:
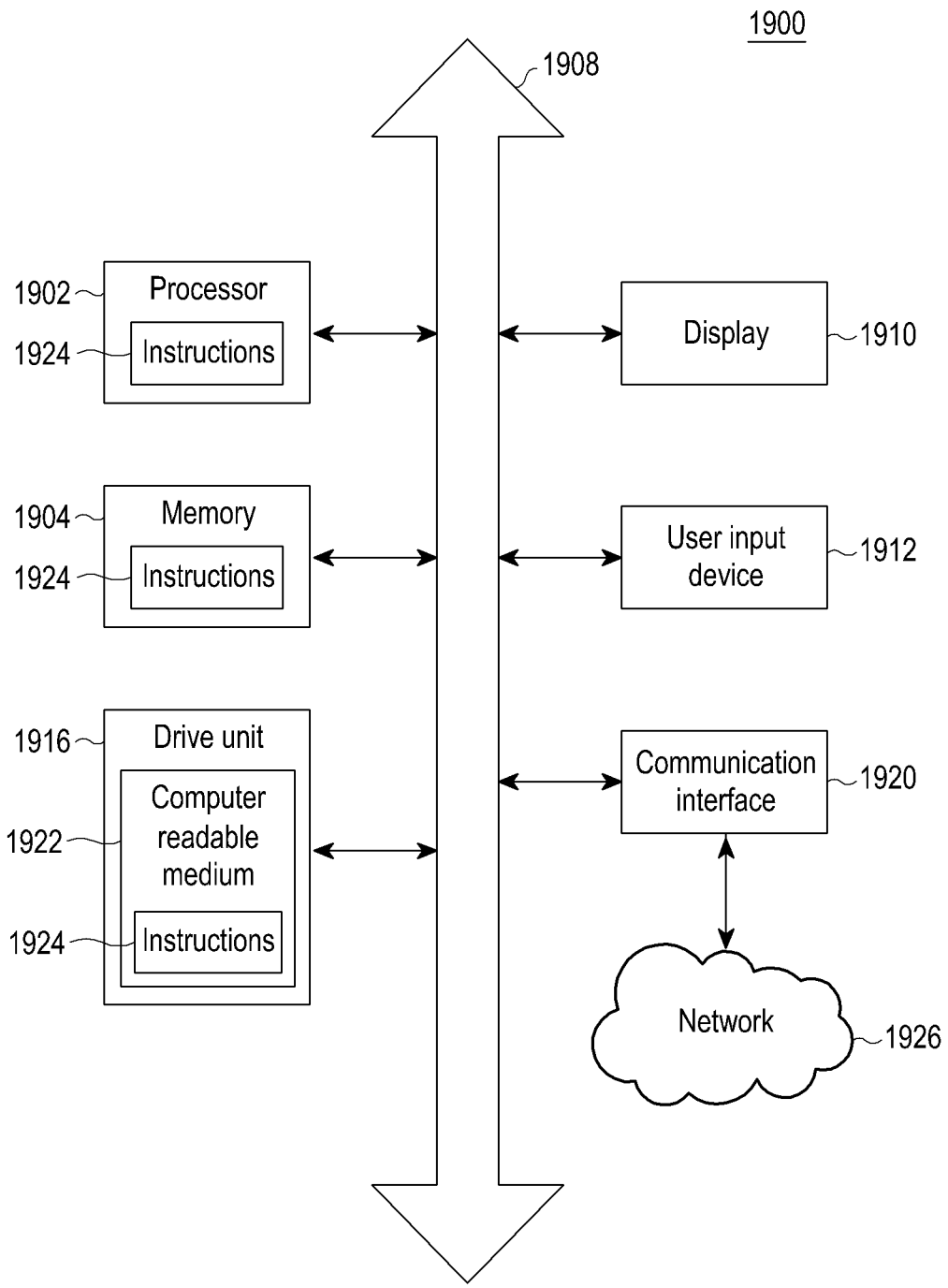
FIG. 19 illustrates a block diagram of a computing device in accordance with an embodiment.

FIG. 19 illustrates a block diagram of a computing device, according to an embodiment. In FIG. 19, a hardware configuration of the system 200 in the form of a computer system 1900 is shown. The computer system 1900 can include a set of instructions 1924 stored in memory 1904 that can be executed to cause the computer system 1900 to perform any one or more of the methods disclosed. The computer system 1900 may operate as a standalone device or may be connected, e.g., using a network, to other computer systems or peripheral devices.

In a networked deployment, the computer system 1900 may operate in the capacity of a server or as a client user computer in a server-client user network environment, or as a peer computer system in a peer-to-peer (or distributed) network environment. The computer system 1900 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 1900 is illustrated, the term "system" shall also be taken to include any collection of systems or sub-systems that individually or jointly execute a set, or multiple sets, of instructions to perform one or more computer functions.

The computer system 1900 may include a processor 1902 e.g., a central processing unit (CPU), a graphics processing unit (GPU), or both. The processor 1902 may be a component in a variety of systems. For example, the processor 1902 may be part of a standard personal computer or a workstation. The processor 1902 may be one or more general processors, digital signal processors, application specific integrated circuits, field programmable gate arrays, servers, networks, digital circuits, analog circuits, combinations thereof, or other now known or later developed devices for analyzing and processing data. The processor 1902 may implement a software program, such as code generated manually (i.e., programmed).

The computer system 1900 may include a memory 1904, such as a memory 1904 that can communicate via a bus 1908. The memory 1904 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1904 includes a cache or random access memory for the processor 1902. In alternative examples, the memory 1904 is separate from the processor 1902, such as a cache memory of a processor, the system memory, or other memory. The memory 1904 may be an external storage device or database for storing data. The memory 1904 is operable to store instructions executable by the processor 1902. The functions, acts or tasks illustrated in the figures or described may be performed by the programmed processor 1902 executing the instructions stored in the memory 1904. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 1900 may include a display unit 1910, such as a liquid crystal display (LCD), an organic light emitting diode (OLED), a flat panel display, a solid state display, a cathode ray tube (CRT), a projector, a printer or other now known or later developed display device for outputting determined information. The display 1910 may act as an interface for the user to see the functioning of the processor 1902, or specifically as an interface with the software stored in the memory 1904 or in the drive unit 1916.

Additionally, the computer system 1900 may include an input device 1912 configured to allow a user to interact with any of the components of system 1900. The computer system 1900 may also include a disk or optical drive unit 1916. The disk drive unit 1916 may include a computer-readable medium 1922 in which one or more sets of instructions 1924, e.g. software, can be embedded. Further, the instructions 1924 may embody one or more of the methods or logic as described. In a particular example, the instructions 1924 may reside completely, or at least partially, within the memory 1904 or within the processor 1902 during execution by the computer system 1900.

The present invention contemplates a computer-readable medium that includes instructions 1924 or receives and executes instructions 1924 responsive to a propagated signal so that a device connected to a network 1926 can communicate voice, video, audio, images or any other data over the network 1926. Further, the instructions 1924 may be transmitted or received over the network 1926 via a communication port or interface 1920 or using a bus 1908. The communication port or interface 1920 may be a part of the processor 1902 or may be a separate component. The communication port 1920 may be created in software or may be a physical connection in hardware. The communication port 1920 may be configured to connect with a network 1926, external media, the display 1910, or any other components in system 1900, or combinations thereof. The connection with the network 1926 may be a physical connection, such as a wired Ethernet connection or may be established wirelessly as discussed later. Likewise, the additional connections with other components of the system 1900 may be physical connections or may be established wirelessly. The network 1926 may alternatively be directly connected to the bus 1908.

The network 1926 may include wired networks, wireless networks, Ethernet AVB networks, or combinations thereof. The wireless network may be a cellular telephone network, an 802.11, 802.16, 802.20, 802.1Q or WiMax network. Further, the network 1926 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet switched network transmission (e.g., TCP/IP, UDP/IP, HTML, HTTP) may be used.

According to embodiments of the disclosure, memory may be saved and performance improved. One of the biggest problems that user faces is related to low memory. A user wants some solution which can save their memory efficiently. Through the disclosure, the device automatically removes duplicate images. Also, through using an intelligent best picture recognition in case of similar images, only one copy (which may be a best picture) is kept in device.

According to embodiments of the disclosure, memory across multiple connected devices may be saved. At least by virtue of the disclosure, the user is able to remove duplicate images across multiple connected devices. All the images which are common in multiple connected devices are detected. After displaying common images, user is given an option to save a one copy in external memory "Family cloud" and delete from all the connected devices (including user's device). Accordingly, the user is facilitated to save memory across multiple networked device. This is indeed helpful for the end users, because memory can be saved in terms of a group of devices like Family, Friends etc.

According to embodiments of the disclosure, improved memory management may be provided. Memory is a domain which is related to daily usage. Conventionally, a user should resort to manual deletion of the redundant/similar/identical images in case of low memory. At least by virtue of the disclosure, things are rendered easy for the end-user, because images are classified and automatically deleted based on an extent of low memory state.

According to embodiments of the present disclosure, an improved user interface may be provided. The embodiments of the disclosure may at least enable a control called 'smart switch', which enables the user to skip bundle of similar images with simple swipe gesture. This is also applicable on the auxiliary devices such as 'Smart watch' and quite helpful as there are restricted options in the Watch.

Figure 20:
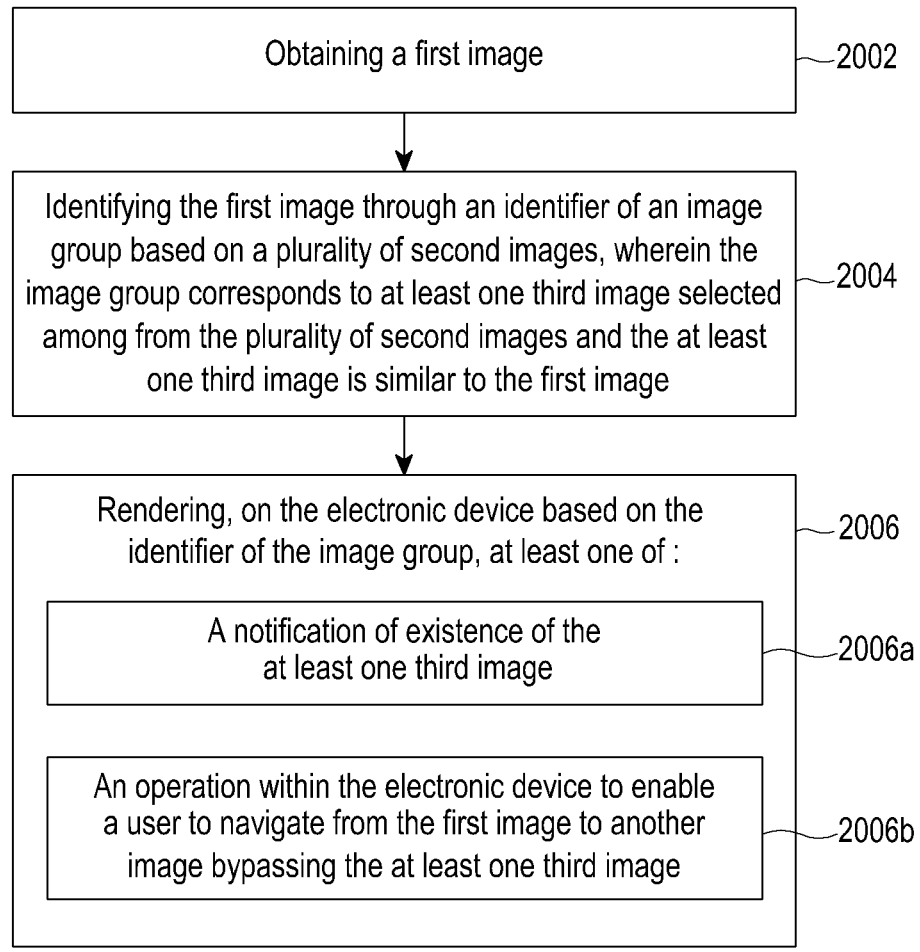
FIG. 20 illustrates a flow chart of a method of identifying an image in an electronic device.

FIG. 20 illustrates a flow chart of a method of identifying an image in an electronic device.

An aspect of the present disclosure provides a method of identifying an image in an electronic device. The method may comprise; obtaining (step 2002) a first image; identifying (step 2004) the first image through an identifier of an image group based on a plurality of second images, wherein the image group corresponds to at least one third image selected among from the plurality of second images and the at least one third image is similar to the first image; and rendering (step 2006), on the electronic device based on the identifier of the image group, at least one of: a notification of existence of the at least one third image (step 2006a); and an operation within the electronic device to enable a user to navigate from the first image to another image bypassing the at least one third image (step 2006b).

The first image may be at least one of a pre-stored image, a pre-captured image, an image in a camera view rendered within the device, an image within the frame of a recorded video, and an image within the frame of a video being recorded. The first image may be identified (step 2004) through an identifier of an image group based on a plurality of second images.

The identification of the first image initiates with dividing the first image into a plurality of segments. An average color values and a dominant color values for each of the segments is determined as a parameter set. The parameter set of the first image is compared with corresponding parameter sets of the plurality of second images to obtain differences between the parameter set and the parameter sets of the plurality of second images. In case of the differences being below predefined thresholds, a group identifier of the at least one third image is associated with the first image. In case of the differences being above the predefined thresholds, a new image group identifier is generated and associated with the first image.

An aspect of the present disclosure provides a method of identifying an image in an electronic device. The method may comprise; obtaining a first image; identifying the first image through an identifier of an image group based on a plurality of second images, wherein the image group corresponds to at least one third image selected among from the plurality of second images and the at least one third image is similar to the first image; and rendering, on the electronic device based on the identifier of the image group, at least one of: a notification of existence of the at least one third image; and an operation within the electronic device to enable a user to navigate from the first image to another image bypassing the at least one third image.

Additionally, the notification may comprise at least one of: a count of the at least one third image; a memory consumption due to presence of the at least one third image; and a presence of at least one fourth image similar to the first image within a shared external storage linked to the electronic device.

The method may further comprise rendering at least one of: the at least one third image around the first image for motivating a user to operate upon the at least one third image; and a plurality of fifth images representing different facial expressions of a living being as identified within the first image.

The method may further comprise: depicting at least one first face image around the first image, the at least one first face image pertaining to a living being identified in the first image; obtaining a selection of a second face image from among the at least one face image; and based on the selection of the second face image, notifying a count of one or more images composed of the first image and the second face image.

Additionally, the identifying comprises: dividing the first image into a plurality of segments; determining average color values and dominant color values for each segment among the plurality of segments as a parameter set including the average color values and the dominant color values, wherein the average color values and the dominant color values are related to alpha red green blue (ARGB) color components; comparing the parameter set of the first image with corresponding parameter sets of the plurality of second images to obtain differences between the parameter set and the parameter sets of the plurality of second images; and in case of the differences being below predefined thresholds, associating a group identifier of the at least one third image with the first image.

Additionally, the identifying further comprises: in case of the differences being above the predefined thresholds, generating a new image group identifier and associating the new image group identifier with the first image.

Additionally, the comparing comprises: classifying the plurality of segments into high and low priority sets, wherein the high priority sets correspond to middle fragments within the first image and refer a high probability of comprising relevant portions of the first image; and scheduling the comparing of parameters for high priority fragments of the first image prior to low priority segments.

The method may further comprise: classifying the at least one third image based on a human being based visual perception as at least one of: an image interpretable as a clear image; an image interpretable as blurred; and an image comprising: a) a first portion interpretable as a clear image, the first portion representing the image similar to the at least one first image, and b) a second portion interpretable as blurred, wherein the visual perception is an electronically simulated criteria within the electronic device to facilitate the classification.

Additionally, the obtaining comprises at least one of: obtaining the first image based on a manual user input of the user through the electronic device; and automatically selecting the image via automatic selection of the electronic device.

Additionally, the first image is configured to be selected from among at least one of: a pre-stored image; a pre-captured image; an image in a camera view rendered within the electronic device; an image within a frame of a recorded video; and an image within a frame of a video being recorded.

Additionally, the image group corresponds to a group of similar images, in accordance with a predetermined threshold.

Additionally, the rendering the notification of the count comprises: displaying a count of non-similar images within a periphery of the first image, wherein the non-similar image comprise a similar face representation that is similar to the first image and different from the first image based on a manifestation of the similar face representation.

Additionally, the shared storage is a centralized storage for maintaining data.

Additionally, the operation to enable the user to navigate through the images within the electronic device comprises: obtaining a user gesture in a predetermined direction within the electronic device; changing the display from the first image to either a similar image or a non-similar image based on the predetermined direction.

Additionally, the method may further comprise: notifying a user through one or more indicators about one or more other images positioned prior to and subsequent to the first in a sequence, the one or more other images being at least one of: a) a similar image; b) a marginally different image than the first image; and c) a different image than the first image, and based on a direction and a magnitude of the received user gesture, changing the display from the first image to the at least one other image.

Additionally, the method may further comprise: based on the at least one third image, facilitating at least one of: modifying the first image based on the at least one third image; in case the first image corresponds to the video frame, modifying of a video based on the at least one third image; updating of a list of emoticons used for text-based communication; creating a multimedia work comprising the first image and the at least one third image; and rendering a wallpaper that automatically changes from an initial state to one or more further states, wherein the initial state corresponds to the first image and further state correspond to the at least one third image.

Additionally, the method may further comprise: defining a plurality of levels with respect to a low memory state within the electronic device; and scheduling an automatic removal of a predetermined class of images upon attainment of a particular level as defined, wherein the class of images correspond to at least one of: a first type of similar images comprising duplicate images; a second type of similar images comprising non-duplicate yet relevant-image; blurred images; and non-frequently used images.

Additionally, the automatic removal of predetermined class of images is at least one of: deletion of images from the main memory of the electronic device; archival of images within the electronic device; and transfer of the images from the electronic device to an external-memory.

Figure 21:
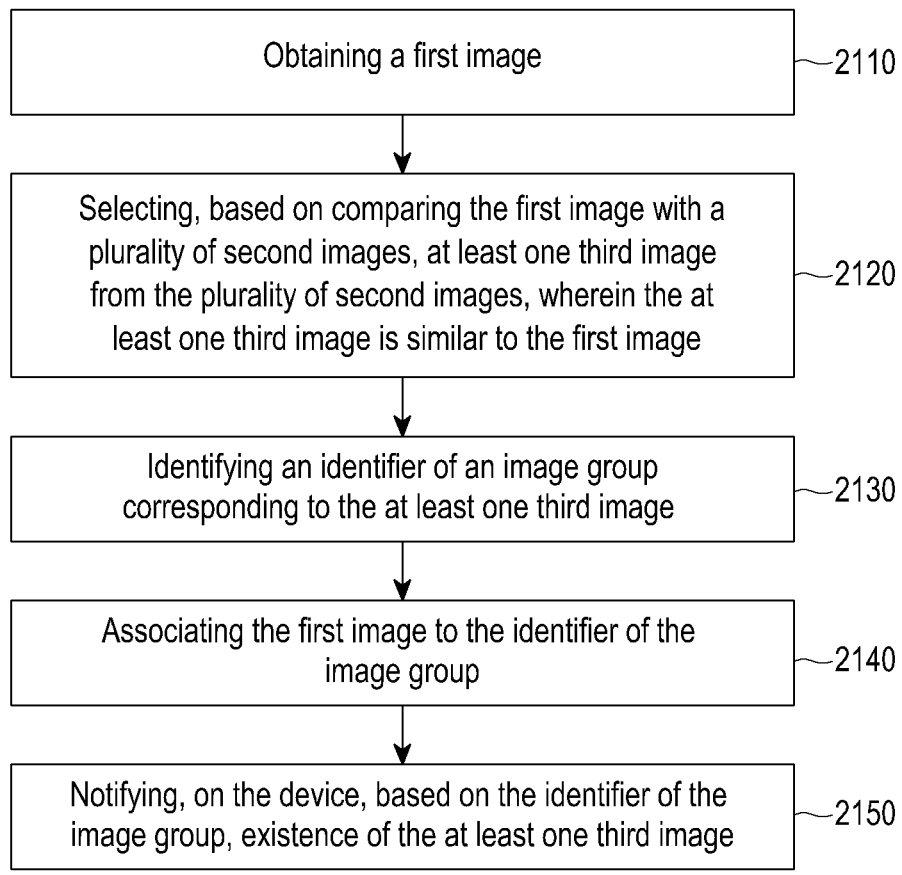
FIG. 21 illustrates a flow chart of a method of processing an image in an electronic device according to this disclosure.

FIG. 21 illustrates a flow chart of a method of processing an image in an electronic device according to this disclosure.

Referring to FIG. 21, an aspect of this disclosure provides a method of processing an image in an electronic device. The method may comprise; obtaining a first image (2110); selecting, based on comparing the first image with a plurality of second images, at least one third image from the plurality of second images, wherein the at least one third image is similar to the first image (2120); identifying an identifier of an image group corresponding to the at least one third image (2130); associating the first image with the identifier of the image group (2140); and notifying, on the device, based on the identifier of the image group, existence of the at least one third image (2150).

A method for determining the similarity between two images (a first image and a second image) is as follows.

The first image is divided into a plurality of (M) segments. In the same way as the first image, the second image is divided into a plurality of (M) segments.

Each segment included in the plurality of segments of the first image includes a plurality of pixels. The plurality of pixels included in each segment are usually composed of alpha-red-green-blue (ARGB), and the color of each element may be one byte.

An average value can be calculated for each color element of the plurality of pixels. That is, the alpha color average value, the red color average value, the green color average value, and the blue color average value corresponding to each segment can be calculated.

The differences between the alpha color average value, the red color average value, the green color average value, the blue color average value of the first image and the alpha color average value, the red color average value, the blue color average value of the second image can be calculated. If the sum of the differences is less than the threshold, it can be determined that the first image and the second image are similar.

The above-described similarity determination method can be expressed by an equation.

Let $A_{1,m,avg}$, $R_{1,m,avg}$, $G_{1,m,avg}$ and $B_{1,m,avg}$ be the alpha color average value, red color average value, green color average value, and blue color average value of the mth segment of the first image, respectively. $A_{1,m,avg}$, $R_{1,m,avg}$, $G_{1,m,avg}$ and $B_{1,m,avg}$ are as follows:

$$A_{1,m,avg} = \frac{1}{n_m} \sum_{p \in S_{1,m}} \text{Alpha}(p)$$

$$R_{1,m,avg} = \frac{1}{n_m} \sum_{p \in S_{1,m}} \text{Red}(p)$$

$$G_{1,m,avg} = \frac{1}{n_m} \sum_{p \in S_{1,m}} \text{Green}(p)$$

$$B_{1,m,avg} = \frac{1}{n_m} \sum_{p \in S_{1,m}} \text{Blue}(p)$$

$S_{1,m}$ denotes an m-th segment of the first image. $n_m$ represents the number of pixels included in the m-th segment.

Alpha (p) means the alpha color value of the pixel p. Red (p) means the red color value of the pixel p. Green (p) is the green color value of pixel p. Blue (p) means the blue color value of pixel p.

Let $A_{2,m,avg}$, $R_{2,m,avg}$, $G_{2,m,avg}$ and $B_{2,m,avg}$ be the alpha color average value, red color average value, green color average value, and blue color average value of the mth segment of the first image, respectively. $A_{2,m,avg}$, $R_{2,m,avg}$, $G_{2,m,avg}$ and $B_{2,m,avg}$ are as follows:

$$A_{2,m,avg} = \frac{1}{n_m} \sum_{p \in S_{2,m}} \text{Alpha}(p)$$

$$R_{2,m,avg} = \frac{1}{n_m} \sum_{p \in S_{2,m}} \text{Red}(p)$$

$$G_{2,m,avg} = \frac{1}{n_m} \sum_{p \in S_{2,m}} \text{Green}(p)$$

$$B_{2,m,avg} = \frac{1}{n_m} \sum_{p \in S_{2,m}} \text{Blue}(p)$$

$S_{2,m}$ denotes an m-th segment of the second image. $n_m$ represents the number of pixels included in the m-th segment.

Alpha (p) means the alpha color value of the pixel p. Red (p) means the red color value of the pixel p. Green (p) is the green color value of pixel p. Blue (p) means the blue color value of pixel p.

$$distance_{1,2} = \sum_{m=1}^{M} (|A_{1,m,avg} - A_{2,m,avg}| + |R_{1,m,avg} - R_{2,m,avg}| + |G_{1,m,avg} - G_{2,m,avg}| + |B_{1,m,avg} - B_{2,m,avg}|)$$

If the distance $distance_{1,2}$ is below the threshold, the first image and the second image are considered to be similar. The threshold may be predetermined according to the degree of similarity, and may be defined by the user. In addition, the standard deviation for each color of each segment can be calculated, and the threshold can be determined by using the standard deviation (for example, $A_{1,m,std}$, $R_{1,m,std}$, $G_{1,m,std}$, $B_{1,m,std}$ of $A_{2,m,std}$, $R_{2,m,std}$, $G_{2,m,std}$, $B_{2,m,std}$) for each color of the segment.

The distance may be weighted for each color. For example, $distance_{1,2}$ can be defined according to the following equation.

$$distance_{1,2} = \sum_{m=1}^{M} (\alpha * |A_{1,m,avg} - A_{2,m,avg}| + \beta * |R_{1,m,avg} - R_{2,m,avg}| + \gamma * |G_{1,m,avg} - G_{2,m,avg}| + \delta * |B_{1,m,avg} - B_{2,m,avg}|)$$

The threshold can be determined based on the above equation.

If there are n images, it is possible to perform all similarity judgments between the images by performing the similarity judgment (n (n−1))/2 between the two images. However, this method requires a lot of computation time. Also, since the computation time is proportional to the square, there is a problem that the computation time increases sharply as the number of images increases.

A method of processing an image according to the present disclosure analyzes similarities in advance for images stored in an electronic device and groups similar images to generate groups of images. To determine the similarity of one image to another, each image is divided into a plurality of segments. Each of the plurality of segments includes a plurality of pixels. For one segment, the color of the included pixels is calculated as an average color value for each of alpha, red, green and blue colors. That is, the alpha color average value, the red color average value, the green color average value, and the blue color average value are calculated for each segment. In order to judge the similarity of the images, the differences between the colors of the segments of the image are summed, and when the sum of the differences of the respective colors of each segment is smaller than the threshold value of each segment, the similar image is judged. For an image group containing one or more images, separate parameters may be calculated. For each image in the image group, the average alpha color average value, the red color average value, the green color average value, and the blue color average value for each segment are averaged, green color average value and group blue color average value. In addition, it is possible to calculate the group alpha color standard deviation value, the group red color standard deviation value, the group green color standard deviation value, and the group blue color standard deviation value of the image group. The group alpha color standard deviation value, the group red color standard deviation value, the group green color standard deviation value, and the group blue color standard deviation value can be used to calculate the threshold value for each color.

In order to determine the similarity between images, determining the similarity between the obtained first image and all the images requires a considerable computation time. Therefore, if it is determined that the image is similar to one of the images belonging to each image group, similarity determination may not be performed for other images belonging to the image group. However, when determining that the first image is similar to only one image within a specific image group, the first image may not be similar to other images included in the image group. That is, although A and B are similar and B and C are similar, A and C may not be similar. However, when an average value of each segment color is calculated in advance for an image group and a color average value of each segment is used, it has an effect of comparing with a representative image in an image group. In addition, the threshold can be set by utilizing the standard deviation of each segment of the image group by color.

According to the present disclosure, a method of easily determining the similarity using an identifier of an image group is disclosed. However, similarity can be determined according to a method of directly comparing individual images without using an image group. At this time, similar images can be obtained by directly comparing the individual images without using the identifier of the image group.

According to the present disclosure, in accordance with the similarity determination described above, a user interface is provided that can conveniently delete similar images selectively, according to a user's input, for similar images or groups of similar images. By displaying only similar images, it is possible to easily select images to be deleted from among similar images, and if the facial expression of a person included in the image is different even if a similar image is provided, the user interface page (UI).

Figure 22:
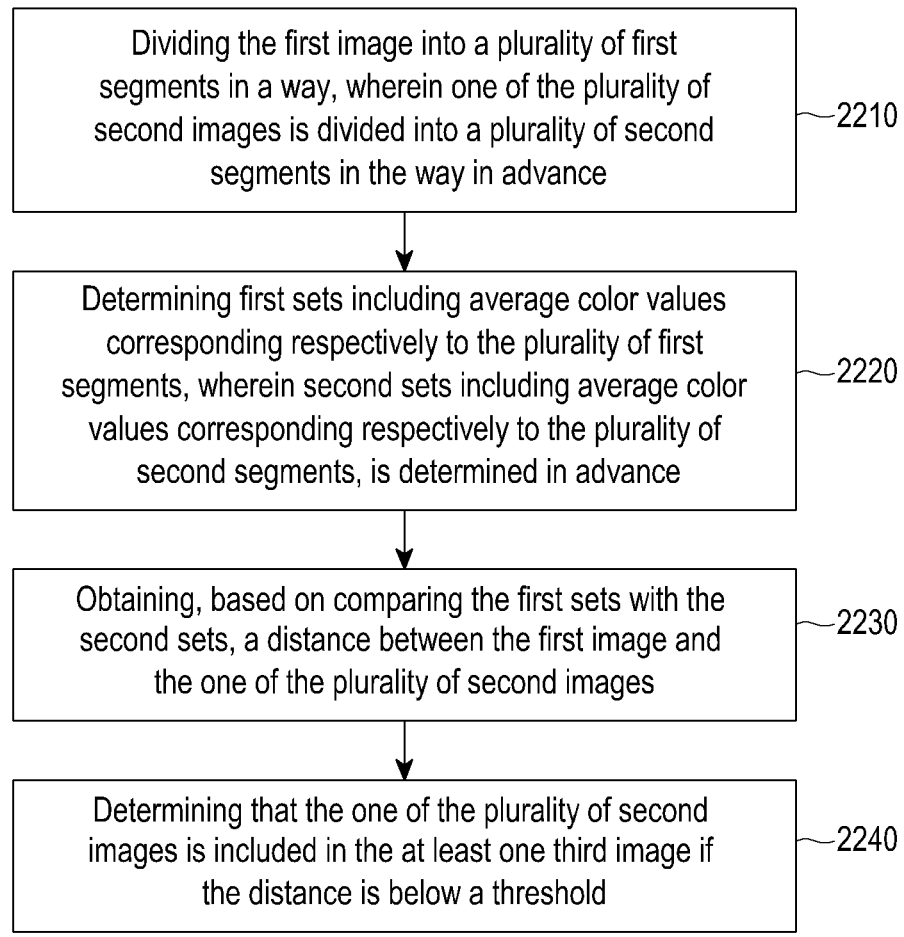
FIG. 22 illustrates a flow chart of a method of processing an image in an electronic device according to this disclosure.

The method may further comprise: displaying the at least one third image around the first image;

The method may further comprise: displaying navigating from the first image to another image by skipping the at least one third image;

FIG. 22 illustrates a flow chart of a method of processing an image in an electronic device according to this disclosure.

The process of selecting at least one third image, may comprise: dividing the first image into a plurality of first segments in a way, wherein one of the plurality of second images is divided into a plurality of second segments in the way in advance (2210); determining first sets including average color values corresponding respectively to the plurality of first segments, wherein second sets including average color values corresponding respectively to the plurality of second segments, is determined in advance (2220); obtaining, based on comparing the first sets with the second sets, a distance between the first image and the one of the plurality of second images (2230); and determining that the one of the plurality of second images is included in the at least one third image if the distance is below a threshold (2240).

The process of selecting at least one third image, may further comprise: determining that the one of the plurality of second images is not included in the at least one third image if the distance is above a threshold.

Additionally, the first average color values may include alpha color value, red color value, green color value and blue color value, and the second average color values may include alpha color value, red color value, green color value and blue color value.

The method may further comprise: determining priorities of the plurality of first segments; comparing the first sets with the second sets based on the priorities of the plurality of first segments.

The method may further comprise: recognizing a plurality of face images by analyzing the plurality of second images; and selecting at least one face image from the plurality of face images, wherein the at least one face image is similar to a face image pertaining to a living being identified in the first image.

The method may further comprise: displaying the at least one face image around the first image.

The method may further comprise: selecting, based on comparing the first image with a plurality of second images, at least one fourth image from the plurality of second images using the recognition of the plurality of face images, wherein the at least one fourth image is not similar to the first image and a face image of the at least one fourth image is similar to the face image pertaining to the living being identified in the first image; identifying a second identifier of an image group corresponding to the at least one fourth image; associating the first image with the second identifier of the image group; and notifying, on the device, based on the second identifier of the image group, existence of the at least one fourth image.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

We claim:

1. A method of processing an image in an electronic device, the method comprising;
   obtaining a first image;
   selecting, based on comparing the first image with a plurality of second images, at least one third image from the plurality of second images, wherein the at least one third image is similar to the first image;
   selecting, based on comparing the first image with the plurality of second images, at least one fourth image from the plurality of second images, wherein the at least one fourth image is not similar to the first image and a face image of the at least one fourth image is similar to a face image pertaining to a living being identified in the first image;
   identifying a first identifier of a first image group corresponding to the at least one third image and a second identifier of a second image group corresponding to the at least one fourth image;
   associating the first image to the first identifier and the second identifier; and
   displaying, on a display of the electronic device, based on the first identifier and the second identifier, information on the first image group and information on the second image group.

2. The method of claim 1, wherein the selecting of the at least one third image comprises:
   dividing the first image into a plurality of first segments, wherein the at least one third image is divided into a plurality of second segments in advance;
   determining first average color values corresponding respectively to the plurality of first segments, wherein second average color values corresponding respectively to the plurality of second segments are determined in advance;
   obtaining, based on comparing the first average color values with the second average color values, a difference between the first image and the at least one third image; and
   determining the at least one third image based on whether the difference is below a threshold.

3. The method of claim 2, wherein the first average color values include alpha color value, red color value, green color value and blue color value, and
   wherein the second average color values include alpha color value, red color value, green color value and blue color value.

4. The method of claim 2, further comprising:
   determining priorities of the plurality of first segments;
   comparing the first average color values with the second average color values based on the priorities of the plurality of first segments.

5. The method of claim 1, further comprising:
   recognizing a plurality of face images by analyzing the plurality of second images; and
   selecting at least one face image from the plurality of face images,
   wherein the at least one face image is similar to the face image pertaining to the living being identified in the first image.

6. The method of claim 5, further comprising:
   displaying the at least one face image around the first image.

7. The method of claim 1, further comprising:
   displaying the at least one third image around the first image.

8. The method of claim 1, further comprising:
   navigating from the first image to another image by skipping the at least one third image.

9. An electronic device for processing an image, the electronic device comprising;
   a display; and
   at least one processor configured to:
   obtain a first image;

select, based on comparing the first image with a plurality of second images, at least one third image from the plurality of second images, wherein the at least one third image is similar to the first image;

select, based on comparing the first image with the plurality of second images, at least one fourth image from the plurality of second images, wherein the at least one fourth image is not similar to the first image and a face image of the at least one fourth image is similar to a face image pertaining to a living being identified in the first image;

identify a first identifier of a first image group corresponding to the at least one third image and a second identifier of a second image group corresponding to the at least one fourth image;

associate the first image to the first identifier and the second identifier; and control the display to display, based on the first identifier and the second identifier, information on the first image group and information on the second image group.

10. The electronic device of claim 9, wherein the at least one processor is further configured to:

divide the first image into a plurality of first segments, wherein the at least one third image is divided into a plurality of second segments in advance;

determine first average color values corresponding respectively to the plurality of first segments, wherein second average color values corresponding respectively to the plurality of second segments are determined in advance;

obtain, based on comparing the first average color values with the second average color values, a difference between the first image and the one of the at least one third image; and determine the at least one third image based on whether the difference is below a threshold.

11. The electronic device of claim 10, wherein the first average color values include alpha color value, red color value, green color value and blue color value, and wherein the second average color values include alpha color value, red color value, green color value and blue color value.

12. The electronic device of claim 10, wherein the at least one processor is further configured to:

determine priorities of the plurality of first segments;

compare the first average color values with the second average color values based on the priorities of the plurality of first segments.

13. The electronic device of claim 9, wherein the at least one processor is further configured to:

recognize a plurality of face images by analyzing the plurality of second images; and select at least one face image from the plurality of face images, wherein the at least one face image is similar to the face image pertaining to the living being identified in the first image.

14. The electronic device of claim 13, wherein the at least one processor is further configured to:

display the at least one face image around the first image.

15. The electronic device of claim 9, wherein the at least one processor is further configured to:

display the at least one third image around the first image.

16. The electronic device of claim 9, wherein the at least one processor is further configured to:

navigate from the first image to another image by skipping the at least one third image.

* * * * *